(12) United States Patent
Sarvi et al.

(10) Patent No.: US 12,497,534 B2
(45) Date of Patent: *Dec. 16, 2025

(54) SEALING FILM COMPOSITIONS FOR SEALING MICROCELLS OF ELECTRO-OPTIC DEVICES

(71) Applicant: E INK CORPORATION, Billerica, MA (US)

(72) Inventors: Ali Sarvi, San Jose, CA (US); Abraham Berhane, Tracy, CA (US); Mary E. Parent, Mountain View, CA (US); Stephen J. Telfer, Arlington, MA (US)

(73) Assignee: E Ink Corporation, Billerica, MA (US)

(*) Notice: Subject to any disclaimer, the term of this patent is extended or adjusted under 35 U.S.C. 154(b) by 513 days.

This patent is subject to a terminal disclaimer.

(21) Appl. No.: 18/055,072

(22) Filed: Nov. 14, 2022

(65) Prior Publication Data
US 2023/0159785 A1 May 25, 2023

Related U.S. Application Data

(60) Provisional application No. 63/281,345, filed on Nov. 19, 2021.

(51) Int. Cl.
G02F 1/1679 (2019.01)
C09D 7/20 (2018.01)
(Continued)

(52) U.S. Cl.
CPC ............ *C09D 129/04* (2013.01); *C09D 7/20* (2018.01); *C09D 7/61* (2018.01); *G02F 1/167* (2013.01);
(Continued)

(58) Field of Classification Search
CPC .......... C09D 129/04; C09D 7/20; C09D 7/61; C09L 75/04; C08K 2201/006; G02F 1/167; G02F 1/1679
(Continued)

(56) References Cited

U.S. PATENT DOCUMENTS 3,955,997 A * 5/1976 Sagane .................... C09D 5/04
525/154
5,149,591 A 9/1992 Patitsas et al.
(Continued)

FOREIGN PATENT DOCUMENTS

JP 2002196372 A 7/2002

OTHER PUBLICATIONS

Thomas.G. Harvey., "Replication techniques for micro-optics"., Proc. vol. 3099, pp. 76-82 (1997) Sep. 24, 1997.
(Continued)

Primary Examiner — Ruiyun Zhang
(74) Attorney, Agent, or Firm — Ioannis Constantinides

(57) ABSTRACT

The present invention is directed to an aqueous sealing composition that comprises a combination of polymers, a poly(vinyl alcohol) homopolymer or poly(vinyl alcohol-co-ethylene) copolymer and a polyurethane, a conductive filler, and a water-soluble ether in an aqueous carrier. The aqueous sealing composition may be used to form a sealing film in electro-optic devices having an electro-optic material layer, comprising (a) a plurality of microcells filled with charged particles and a non-polar fluid and (b) a sealing film, wherein the electro-optic material layer is disposed between two electrode layers. The device exhibits good electro-optic performance.

18 Claims, 14 Drawing Sheets

(51) Int. Cl.
*C09D 7/61* (2018.01)
*C09D 129/04* (2006.01)
*G02F 1/167* (2019.01)
*G02F 1/1681* (2019.01)
*C08L 75/04* (2006.01)

(52) U.S. Cl.
CPC .......... *G02F 1/1679* (2019.01); *G02F 1/1681* (2019.01); *C08K 2201/006* (2013.01); *C08L 75/04* (2013.01)

(58) Field of Classification Search
USPC .............................................. 428/1.5
See application file for complete search history.

(56) References Cited

U.S. PATENT DOCUMENTS

| | | | |
|---|---|---|---|
| 6,241,921 | B1 | 6/2001 | Jacobson et al. |
| 6,922,276 | B2 | 7/2005 | Zhang et al. |
| 6,933,098 | B2 | 8/2005 | Chan-Park et al. |
| 6,982,178 | B2 | 1/2006 | LeCain et al. |
| 7,002,728 | B2 | 2/2006 | Pullen et al. |
| 7,005,468 | B2 | 2/2006 | Zang et al. |
| 7,012,600 | B2 | 3/2006 | Zehner et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,144,942 | B2 | 12/2006 | Zang et al. |
| 7,170,670 | B2 | 1/2007 | Webber |
| 7,312,784 | B2 | 12/2007 | Baucom et al. |
| 7,411,719 | B2 | 8/2008 | Paolini, Jr. et al. |
| 7,453,445 | B2 | 11/2008 | Amundson |
| 7,535,624 | B2 | 5/2009 | Amundson et al. |
| 7,561,324 | B2 | 7/2009 | Duthaler et al. |
| 7,615,325 | B2 | 11/2009 | Liang et al. |
| 7,679,814 | B2 | 3/2010 | Paolini, Jr. et al. |
| 7,715,088 | B2 | 5/2010 | Liang et al. |
| 7,839,564 | B2 | 11/2010 | Whitesides et al. |
| 8,009,348 | B2 | 8/2011 | Zehner et al. |
| 8,830,561 | B2 | 9/2014 | Zang et al. |
| 9,279,906 | B2 | 3/2016 | Kang |
| 9,315,688 | B2 | 4/2016 | Yanan et al. |
| 9,834,354 | B2 | 12/2017 | Kumar et al. |
| 9,958,752 | B2 | 5/2018 | Yamada et al. |
| 10,444,553 | B2 | 10/2019 | Laxton |
| 11,041,067 | B1 | 6/2021 | Vacca et al. |
| 2004/0120024 | A1 | 6/2004 | Chen et al. |
| 2004/0219306 | A1 | 11/2004 | Wang et al. |
| 2015/0005720 | A1 | 1/2015 | Zang et al. |
| 2015/0098124 | A1 | 4/2015 | Li et al. |
| 2016/0012710 | A1 | 1/2016 | Lu et al. |
| 2017/0205649 | A1 | 7/2017 | Wang et al. |
| 2022/0244612 | A1 | 8/2022 | Sarvi et al. |
| 2022/0251364 | A1 | 8/2022 | Sarvi et al. |

OTHER PUBLICATIONS

Korean Intellectual Property Office, "International Search Report and Written Opinion", PCT/US2022/079784, Mar. 17, 2023. Mar. 17, 2023.
European Patent Office, "Extended European Search Report", EP Appl. No. 22896645.3, Aug. 28, 2025.

\* cited by examiner 4.5 inch 12 inch 10 inch 3 inch

SEALING FILM COMPOSITIONS FOR SEALING MICROCELLS OF ELECTRO-OPTIC DEVICES

RELATED APPLICATIONS

This application claims priority to U.S. Provisional Patent Application No. 63/281,345, filed on Nov. 19, 2021. The entire contents of any patent, published application, or other published work referenced herein is incorporated by reference.

FIELD OF THE INVENTION

This invention relates to a sealing film that can be used in electro-optic devices, such as electrophoretic displays. The sealing film comprises poly(vinyl alcohol) homopolymer or poly(vinyl alcohol-co-ethylene) copolymer, polyurethane, a conductive filler, and a water-soluble ether. The sealing film can be formed by curing or drying an aqueous sealing composition.

BACKGROUND OF THE INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic devices. This type of display is properly called "multi-stable" rather than bistable, although for convenience the term "bistable" may be used herein to cover both bistable and multi-stable displays.

One type of electro-optic device, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film.

The technologies described in these patents and applications include:
(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276; and 7,411,719;
(c) Microcell structures, wall materials, and methods of forming microcells; see for example U.S. Pat. Nos. 7,072,095; and 9,279,906;
(d) Methods for filling and sealing microcells; see for example U.S. Pat. Nos. 7,144,942; 7,005,468; and 7,715,088; and U.S. Patent Application Publications Nos. 2004-0120024; and 2004-0219306;
(e) Films and sub-assemblies containing electro-optic materials; see for example U.S. Pat. Nos. 6,982,178; and 7,839,564;
(f) Backplanes, adhesive layers and other auxiliary layers and methods used in displays; see for example U.S. Pat. Nos. 7,116,318; and 7,535,624;
(g) Color formation and color adjustment; see for example U.S. Pat. Nos. 7,075,502; and 7,839,564;
(h) Methods for driving displays; see for example U.S. Pat. Nos. 7,012,600; and 7,453,445;
(i) Applications of displays; see for example U.S. Pat. Nos. 7,312,784; and 8,009,348; and
(j) Non-electrophoretic displays, as described in U.S. Pat. No. 6,241,921; and U.S. Patent Applications Publication No. 2015/0277160; and applications of encapsulation and microcell technology other than displays; see for example U.S. Pat. No. 7,615,325; and U.S. Patent Application Publications Nos. 2015/0005720 and 2016/0012710.

The contents of all of the above references are incorporated herein by reference in their entirety.

Structures having a plurality of sealed microcells containing a dispersion of charged pigment particles in a non-polar fluid are used commercially in electro-optic devices. The microcells are also known as microcavities or microcups in the literature. A typical process of making sealed microcell structures for electro-optic devices involves (a) fabricating, via microembossing, a polymeric sheet having a plurality of microcavities, wherein each microcavity has an opening, (b) filling the microcavities with an electrophoretic medium, which is a dispersion comprising charged pigment particles in a non-polar fluid, and (c) sealing the microcavities with an aqueous sealing composition, forming a sealing film. The sealed microcavities, which contain electrophoretic medium, form the electro-optic material layer of the device. The electro-optic material layer is disposed between a front and a rear electrode. Application of an electric field across the electrophoretic medium via these electrodes causes pigment particles to migrate through the electrophoretic medium creating an image. The sealing film plays an important role for the function and performance of the device. Firstly, as the sealing film is in contact with the electrophoretic medium and seals it inside the microcavities, it must (1)

be practically insoluble to the non-polar fluid of the electrophoretic medium and (2) be a good barrier to the non-polar fluid, so that the non-polar fluid does not diffuse out form the microcells during the life of the device. Secondly, the sealing film must not absorb significant amount of moisture from the environment; that is, it must prevent environmental moisture from entering into the electrophoretic medium of the device; such moisture may negatively affect the electro-optic performance of the device. The sealing film should be mechanically resilient during the useful life of the device and have optimum volume resistivity that remains practically constant over time. Inferior barrier properties of the sealing film towards the non-polar fluids lead to the reduction of the fluid from the electrophoretic medium and to the sagging of the sealing film. Finally, the electrically conductive properties of the sealing film are important, because electrical potential is applied across the device and propagated via the sealing film, among other components. The technical problem of providing aqueous sealing compositions that form sealing films with these features is difficult, because the different objectives may require different formulation strategies. For examples, barrier property for non-polar fluids typically require more hydrophilic components, whereas such components absorb more moisture from the environment. If the sealing film has low electrical conductivity, the operation of the device requires increased power consumption, whereas too high conductivity may cause inferior image quality because of blooming. Thus, there is a need for aqueous sealing compositions that form optimized sealing films for improved barrier towards non-polar fluids, reduced moisture absorption, and improved electro-optic performance. The inventors of the present invention found that sealing film compositions comprising combination of poly(vinyl alcohol) homopolymer or poly(vinyl alcohol-co-ethylene) copolymer, polyurethane, conductive carbon black, and a water-soluble ether provide sealing films with good electro-optic performance and superior color.

SUMMARY OF THE INVENTION

In one aspect, the present invention is directed to a sealing film comprising a sealing film comprising: a water-soluble poly(vinyl alcohol) homopolymer or poly(vinyl alcohol-co-ethylene) copolymer at a content of from 15 weight % to 60 weight % by weight of the sealing film, the poly(vinyl alcohol) homopolymer having a degree of hydrolysis of from 90% to 99.5%, and the poly(vinyl alcohol-co-ethylene) copolymer having a degree of hydrolysis of from 90% to 99.5% and ethylene content of less than 10%; a polyurethane at a content of from 7 weight % to 29 weight % by weight of the sealing film; carbon black at a content of from 5 weight % to 70 weight % by weight of the sealing film; and a water-soluble ether at a content of from 0.5 weight % to 25 wt % by weight of the sealing film.

The poly(vinyl alcohol) homopolymer or poly(vinyl alcohol-co-ethylene) copolymer may have number average molecular weight from 1,000 to 1,000,000 Daltons. The poly(vinyl alcohol) polymer or poly(vinyl alcohol-co-ethylene) copolymer may have a degree of hydrolysis of from 92% to 99%. The polyurethane polymer may have number average molecular weight from 1,000 to 2,000,000 Daltons. The polyurethane may be an ester polyurethane, a polycarbonate polyurethane, or a combination thereof. The total surface energy of the sealing film may be lower than 60 mN/m. The interfacial tension between the water-soluble poly(vinyl alcohol) polymer or poly(vinyl alcohol-co-ethylene) copolymer and the polyurethane may be less than 2 mN/m. The sealing film may further comprise an organosilicone wetting agent.

The water-soluble ether has molecular weight of from 75 to 5,000 Dalton, and optionally comprising a hydroxyl group. The water-soluble ether is a represented by Formula I, Formula II, or Formula III,

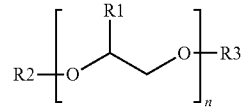

Formula I

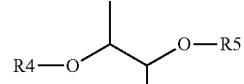

Formula II

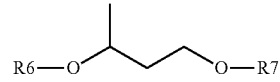

Formula III wherein n is 1 to 145; R1 is hydrogen, methyl or ethyl group; R2, R3, R4, R5, R6, and R7 are selected independently from the group consisting of hydrogen, linear or branched alkyl group comprising from 1 carbon atom to 6 carbon atoms, phenyl, and benzyl group; Formula I comprises at least one ether functional group; Formula II comprises at least one ether functional group; and Formula III comprises at least one ether functional group. For Formula I, n may be 1 to 10. The sealing film may having volume resistivity of from $10^8$ to $10^{10}$ Ohm·cm.

In another aspect, the present invention is directed to an electrophoretic device comprising a conductive layer; a microcell layer comprising a plurality of microcells, each microcell including an opening, each microcell comprising an electrophoretic medium, the electrophoretic medium comprising charged particles in a non-polar carrier; a sealing film, the sealing film spanning the opening of each microcell; an adhesive layer; and an electrode layer. The sealing film comprises: a water-soluble poly(vinyl alcohol) homopolymer or poly(vinyl alcohol-co-ethylene) copolymer at a content of from 15 weight % to 60 weight % by weight of the sealing film, the poly(vinyl alcohol) homopolymer having a degree of hydrolysis of from 90% to 99.5%, and the poly(vinyl alcohol-co-ethylene) copolymer having a degree of hydrolysis of from 90% to 99.5% and ethylene content of less than 10%; a polyurethane at a content of from 7 to 29 weight % by weight of the sealing film; carbon black at a content of from 5 weight % to 70 weight % by weight of the sealing film; a water-soluble ether at a content of from 0.5 weight % to 25 wt % by weight of the sealing film, the water-soluble ether having molecular weight of from 70 to 5,000 Dalton, and optionally comprising a hydroxyl group. The electrophoretic medium may comprise at least three types of charged pigment particles, one type of charged particles having a color selected from the group consisting of blue, green, red, cyan, magenta, and yellow.

In yet another aspect, the present invention is directed to a aqueous sealing composition comprising: a water-soluble poly(vinyl alcohol) homopolymer or poly(vinyl alcohol-co-ethylene) copolymer at a content of from 14 weight % to 55 weight % by weight of the sealing composition excluding water, the poly(vinyl alcohol) homopolymer having a degree of hydrolysis of from 90% to 99.5%, and the poly(vinyl alcohol-co-ethylene) copolymer having a degree of hydrolysis of from 90% to 99.5% and ethylene content of less than 10%; a polyurethane at a content of from 6 weight % to 27 weight % by weight of the aqueous sealing composition excluding water; carbon black at a content of from 5 weight % to 64 weight % by weight of the aqueous sealing composition excluding water; a water-soluble ether at a content of from 1.0 weight % to 40 weight % by weight of the aqueous sealing composition excluding water, the water-soluble ether having molecular weight of from 75 to 5,000 Dalton, and optionally comprising a hydroxyl group; and water at a content of from 20 weight % to 95 weight % by weight of the aqueous sealing composition. The aqueous sealing composition may further comprise a crosslinker at a content of from 0.1 weight % to 8 weight % by weight of the aqueous sealing composition excluding water, the crosslinker being a polyisocyanate, a multifunctional polycarbodiimide, a multifunctional aziridine, a silane coupling agent, a boron/titanium/zirconium-based crosslinker, or a melamine formaldehyde. The aqueous sealing composition may further comprise a rheology modifier at a content of from 0.05 weight % to 5 weight % by weight of the aqueous sealing composition excluding water.

BRIEF DESCRIPTION OF THE DRAWINGS

In FIGS. 6C and 6D a combination of top and bottom exposure is used, allowing the partition walls in one lateral direction to be cured by top photomask exposure, and the partition walls in another lateral direction to be cured by bottom exposure through the opaque base conductor film.

DETAILED DESCRIPTION OF THE INVENTION

As used herein, "molecular weight" refers to the weight average molecular weight of a compound, unless otherwise stated. Molecular weight is measured using industry standard method, gel permeation chromatography.

Degree of hydrolysis of poly(vinyl alcohol) homopolymer or poly(vinyl alcohol-co-ethylene) copolymer is the ratio of the number of moles of vinyl alcohol groups over the sum of the number of moles of the vinyl alcohol groups and the number of moles of the vinyl acetate groups in the polymer. Thus, in the example of a simplified polyvinyl alcohol formula provided below (Formula IV), the degree of hydrolysis is calculated by Equation 1.

$$\text{Degree of hydrolysis} = 100 \times p/(p+q) \qquad \text{Equation 1}$$

Manufacturers of polyvinyl alcohol typically report the degree of hydrolysis of their products. This parameter affects important physical properties of the polymer, such as water solubility of the polymer and water resistance of the corresponding dry film. A titration method is used to determine the degree of hydrolysis of polyvinyl alcohols (homopolymers and copolymers) Details of the method are described in Method JIS K 6726 (Japanese Standard Association, 94th Edition, Oct. 20, 2017).

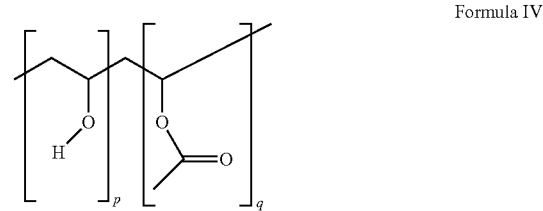

Formula IV

The terms "sealing film" and "sealing layer" are synonymous and are used interchangeably in relation to an electro-optic device.

The terms "adhesive film" and "adhesive layer" are synonymous and are used interchangeably in relation to an electro-optic device.

Unless otherwise stated, the disclosed contents of the components of the sealing film are calculated as weight % of the component by weight of the sealing film excluding water. Unless otherwise stated, the disclosed contents of the components of the aqueous sealing composition are calculated as weight % of the component by weight of the aqueous sealing composition excluding water.

A. Structure of Microcells

Figure 1:
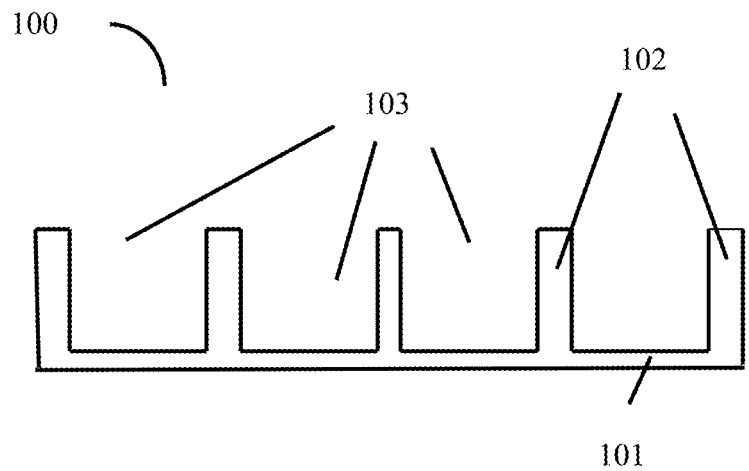
FIG. 1 illustrates a side view of a structure of a plurality of microcells before they are filled and sealed.

FIG. 1 illustrates a side view of a structure of a plurality of microcells 100 before they are filled and sealed. Each microcell comprises a bottom 101, partition walls 102, and an opening 103.

B. Structure of Electro-Optic Devices Comprising Microcell Structures

Figure 2:
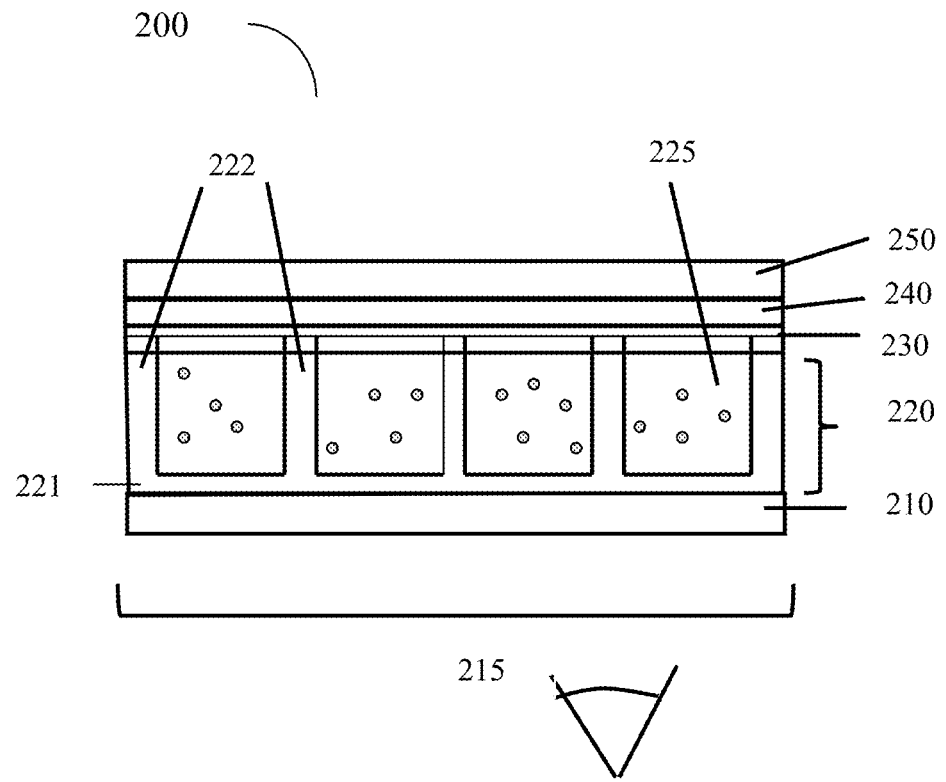
FIG. 2 illustrates a side view of an example of an electro-optic device comprising a microcell structure.

FIG. 2 illustrates a side view of an example of an electro-optic device 200 comprising microcells. This example of electro-optic device 200 comprises a first light-transmissive electrode layer 210, a microcell layer 220, a sealing film 230, an adhesive layer 240, and a second electrode layer 250. The microcell layer comprises a plurality of microcells that are defined by a bottom 221 and partition walls 222. Each of the plurality of microcells contains electrophoretic medium 225, which comprises charged particles in a non-polar fluid. The microcells are sealed with a sealing film 230, which spans the openings of the plurality of the microcells. A second electrode layer 250 is connected to the sealing film 230 with an adhesive layer 240. The plurality of microcells sealed by sealing layer 230 and including electrophoretic medium 225 comprises the electro-optic material layer of the electro-optic device 200. A source of an electric field may connect the first light-transmissive electrode layer 210 with the second electrode layer 250. Application of an electric field across the electrophoretic material layer causes the charge particles to migrate through the electrophoretic medium, creating an image that can be observed by an observer looking from the viewing side 215 of the electro-optic device 200. An optional primer layer, which is not shown in FIG. 2, may be disposed between the first light-transmissive electrode layer 210 and the plurality of microcells 222.

Figure 3:
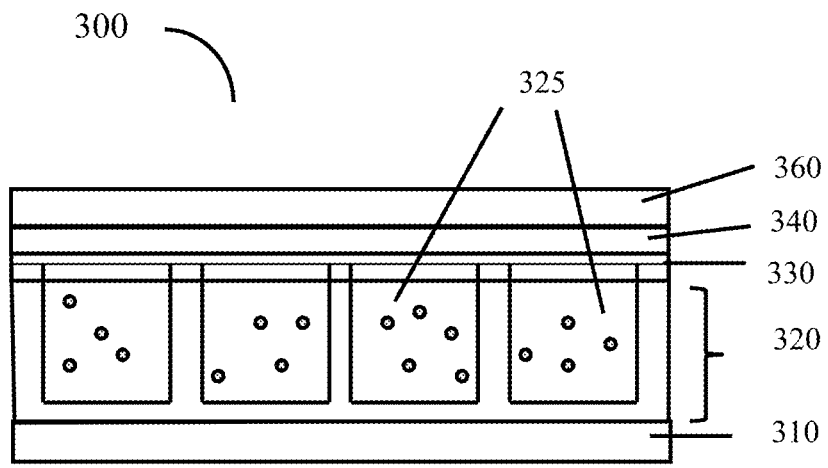
FIG. 3 illustrates a side view of an example of a front plane laminate assembly that can be used to form an electro-optic device comprising a microcell structure.

The example of an electro-optic device illustrated in FIG. 2 may be constructed by a front plane laminate 300, which is shown in FIG. 3. The front plane laminate 300 comprises a first light-transmissive electrode layer 310, a microcell layer 320 comprising a plurality of microcells 325, a sealing film 330, an adhesive layer 340, and a release sheet 360. Each microcell of the plurality of microcells contains electrophoretic medium 325, which comprises charged particles in a non-polar fluid. Microcells 325 are sealed with a sealing film 330, which spans the openings of the plurality of the microcells. A release sheet 360 is connected to the sealing film 330 with an adhesive layer 340. Removal of the release sheet 360 exposes the surface of the adhesive layer 340, which may be connected onto a second electrode layer to form an electro-optic device. An optional primer layer, which is not shown in FIG. 3, may be disposed between the first light-transmissive electrode layer 310 and the plurality of microcells 330.

Figure 4:
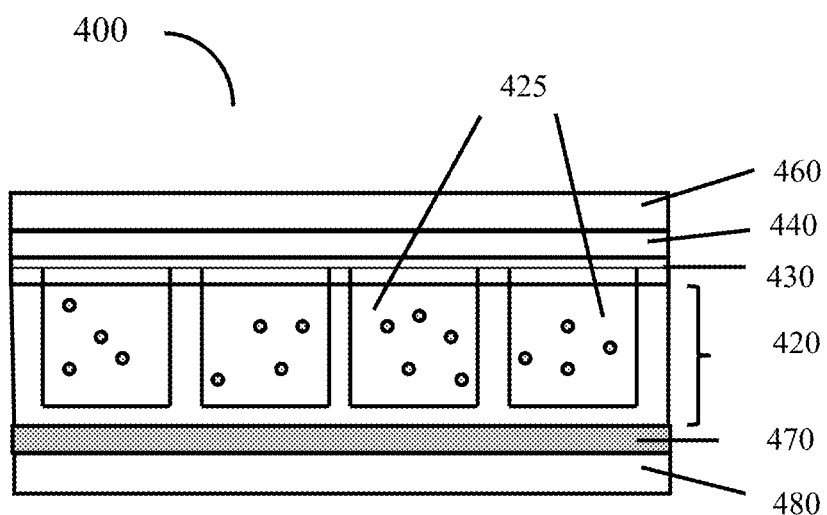
FIG. 4 illustrates a side view of an example of a double release sheet that can be used to form an electro-optic device comprising a microcell structure.

The example of an electro-optic device illustrated in FIG. 2 may also be constructed by a double release sheet 400 that is shown in FIG. 4. The double release sheet 400 comprises a first release sheet 480, a first adhesive layer 470, a microcell layer 420 comprising a plurality of microcells 425, a sealing film 430, a second adhesive layer 440, and a second release sheet 460. Each of the plurality of microcells contains electrophoretic medium 425, which comprises charged particles in a non-polar fluid. The microcells are sealed with a sealing film 430, which spans the openings of the plurality of the microcells. The first release sheet 480 is connected to the microcell layer 420 with the first adhesive layer 470. The second release sheet 460 is connected to the sealing film 430 with the second adhesive layer 440. Removal of the first release sheet 480 exposes the surface of the first adhesive layer 470, which may be connected onto a first light-transmissive electrode layer. Removal of the second release sheet 460 exposes the surface of the second adhesive layer 440, which may be connected onto a second electrode layer to form an electro-optic device. An optional primer layer, which is not shown in FIG. 4, may be disposed between first adhesive layer 470 and microcell layer 430.

C. Formation of Microcell Structures

Figure 5:
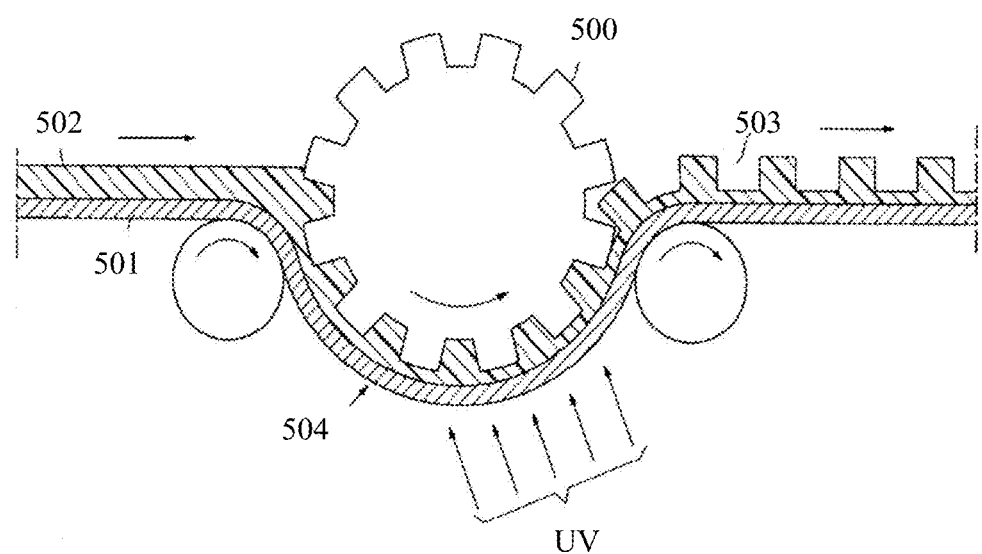
FIG. 5 shows a method for making microcells using a roll-to-roll process.

Techniques for constructing microcells. Microcells may be formed either in a batchwise process or in a continuous roll-to-roll process as disclosed in U.S. Pat. No. 6,933,098. The latter offers a continuous, low cost, high throughput manufacturing technology for production of compartments for use in a variety of applications including benefit agent delivery and electrophoretic displays. Microcell arrays suitable for use with the invention can be created with microembossing, as illustrated in FIG. 5. A male mold 500 may be placed either above the web 504 or below the web 504 (not shown); however, alternative arrangements are possible. For examples, please see U.S. Pat. No. 7,715,088, which is incorporated herein by reference in its entirety. A conductive substrate may be constructed by forming a conductor film 501 on polymer substrate that becomes the backing layer for a device. A composition comprising a thermoplastic, thermoset, or a precursor thereof 502 is then coated on the conductor film. The thermoplastic or thermoset precursor layer is embossed at a temperature higher than the glass transition temperature of the thermoplastics or thermoset precursor layer by the male mold in the form of a roller, plate or belt.

The thermoplastic or thermoset precursor for the preparation of the microcells may be multifunctional acrylate or methacrylate, vinyl ether, epoxide and oligomers or polymers thereof, and the like. A combination of multifunctional epoxide and multifunctional acrylate is also very useful to achieve desirable physico-mechanical properties. A cross-linkable oligomer imparting flexibility, such as urethane acrylate or polyester acrylate, may be added to improve the flexure resistance of the embossed microcells. The composition may contain polymer, oligomer, monomer and additives or only oligomer, monomer and additives. The glass transition temperatures ($T_g$) for this class of materials usually range from about −70° C. to about 150° C., or from about −20° C. to about 50° C. The microembossing process is typically carried out at a temperature higher than the $T_g$. A heated male mold or a heated housing substrate against which the mold presses may be used to control the microembossing temperature and pressure.

As shown in FIG. 5, the mold is released during or after the precursor layer is hardened to reveal an array of microcells 503. The hardening of the precursor layer may be accomplished by cooling, solvent evaporation, cross-linking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer. A male mold may be prepared by any appropriate method, such as a diamond turn process or a photoresist process followed by either etching or electroplating. A master template for the male mold may be manufactured by any appropriate method, such as electroplating. With electroplating, a glass base is sputtered with a thin layer (typically 3000 Å) of a seed metal such as chrome inconel. The mold is then coated with a layer of photoresist and exposed to UV. A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition. The floor of the mold is typically between about 50 to 400 microns. The master can also be made using other microengineering techniques including e-beam writing, dry etching, chemical etching, laser writing or laser interference as described in "Replication techniques for micro-optics", SPIE Proc. Vol. 3099, pp. 76-82 (1997). Alternatively, the mold can be made by photomachining using plastics, ceramics or metals.

Prior to applying a UV curable resin composition, the mold may be treated with a mold release to aid in the demolding process. The UV curable resin may be degassed prior to dispensing and may optionally contain a solvent. The solvent, if present, readily evaporates. The UV curable resin is dispensed by any appropriate means such as, coating, dipping, pouring or the like, over the male mold. The dispenser may be moving or stationary. A conductor film is overlaid the UV curable resin. Pressure may be applied, if necessary, to ensure proper bonding between the resin and the plastic and to control the thickness of the bottom of the microcells. The pressure may be applied using a laminating roller, vacuum molding, press device or any other like means. If the male mold is metallic and opaque, the plastic substrate is typically transparent to the actinic radiation used to cure the resin. Conversely, the male mold can be transparent and the plastic substrate can be opaque to the actinic radiation. To obtain good transfer of the molded features onto the transfer sheet, the conductor film needs to have good adhesion to the UV curable resin, which should have a good release property against the mold surface.

Microcell arrays for the invention typically include a pre-formed conductor film, such as indium tin oxide (ITO) conductor lines; however, other conductive materials, such as silver or aluminum, may be used. The conductive layer may be backed by or integrated into substrates such as polyethylene terephthalate, polyethylene naphthalate, polyaramid, polyimide, polycycloolefin, polysulfone, epoxy and their composites. The conductor film may be coated with a radiation curable polymer precursor layer. The film and precursor layer are then exposed imagewise to radiation to form the microcell wall structure. Following exposure, the precursor material is removed from the unexposed areas, leaving the cured microcell partition walls bonded to the conductor film/support web. The imagewise exposure may be accomplished by UV or other forms of radiation through a photomask to produce an image or predetermined pattern of exposure of the radiation curable material coated on the conductor film. Although it is generally not required, the mask may be positioned and aligned with respect to the conductor film, i.e., ITO lines, so that the transparent mask portions align with the spaces between ITO lines, and the opaque mask portions align with the ITO material (intended for microcell cell bottom areas).

Figure 6A:
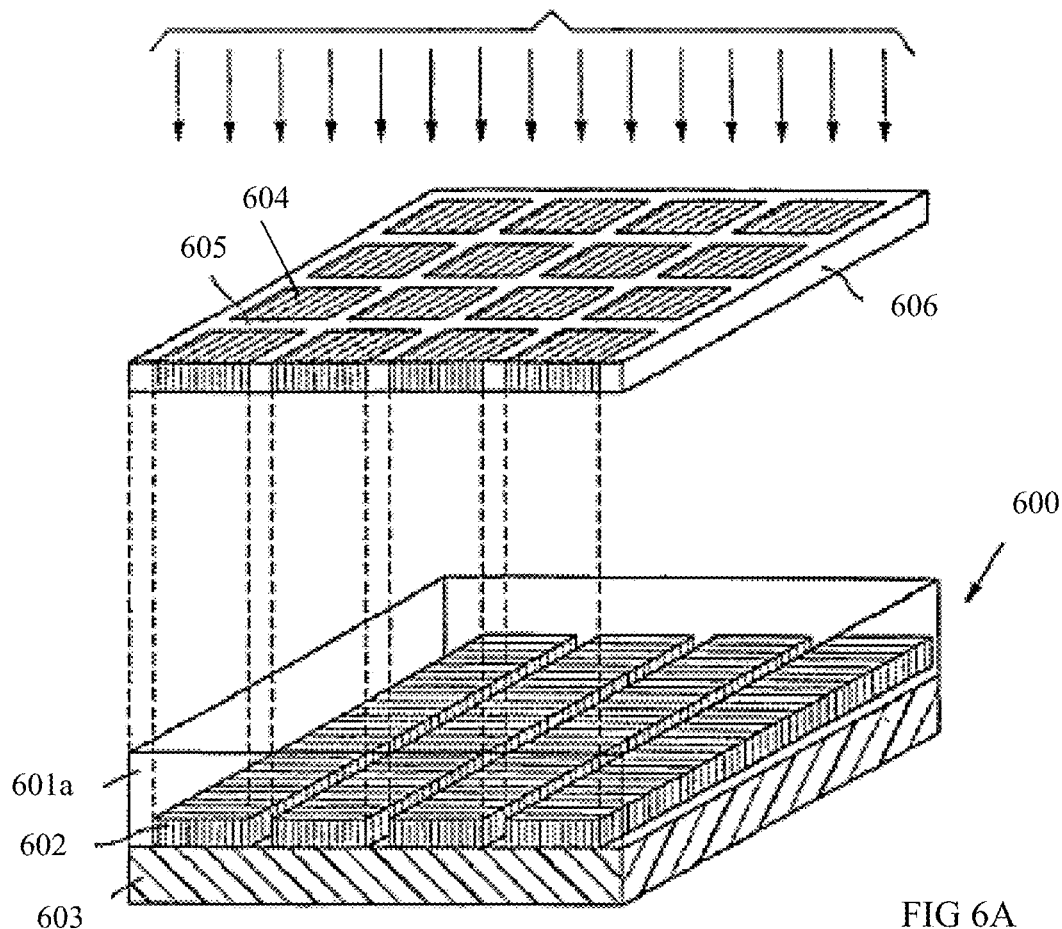
FIGS. 6A and 6B detail the production of microcells using photolithographic exposure through a photomask of a conductor film coated with a thermoset precursor.
Figure 6B:
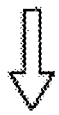
Figure 6B:
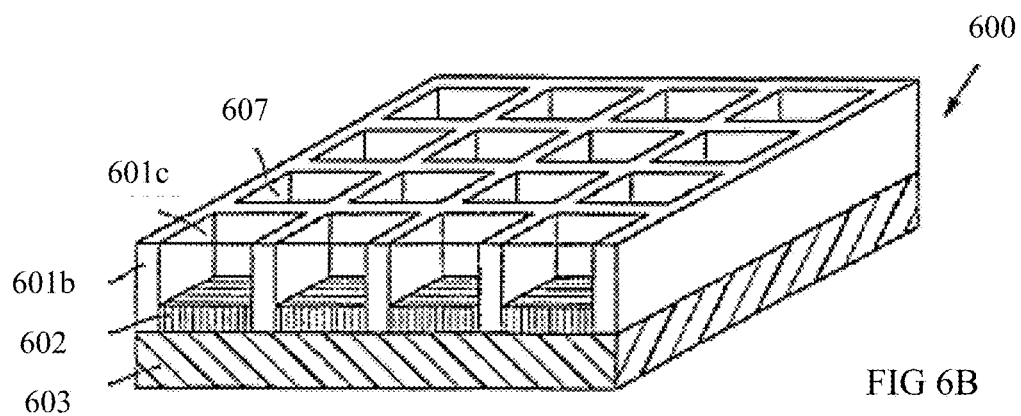

Photolithography. Microcells can also be produced using photolithography. Photolithographic processes for fabricating a microcell array are illustrated in FIGS. 6A and 6B. As shown in FIGS. 6A and 6B, the microcell array 600 may be prepared by exposure of a radiation curable material 601a coated by known methods onto a conductor electrode film 602 to UV light (or alternatively other forms of radiation, electron beams and the like) through a mask 606 to form partition walls 601b corresponding to the image projected through the mask 606. The base conductor film 602 is preferably mounted on a supportive substrate base web 603, which may comprise a plastic material.

In the photomask 606 in FIG. 6A, the dark squares 604 represent the opaque area and the space between the dark squares represents the transparent area 605 of the mask 606. The UV radiates through the transparent area 605 onto the radiation curable material 601a. The exposure is preferably performed directly onto the radiation curable material 601a, i.e., the UV does not pass through the substrate 603 or base conductor 602 (top exposure). For this reason, neither the substrate 603, nor the conductor 602, needs to be transparent to the UV or other radiation wavelengths employed.

As shown in FIG. 6B, the exposed areas 601b become hardened and the unexposed areas (protected by the opaque area 604 of the mask 606) are then removed by an appropriate solvent or developer to form the microcells 607. The solvent or developer is selected from those commonly used for dissolving or reducing the viscosity of radiation curable materials such as methylethylketone (MEK), toluene, acetone, isopropanol or the like. The preparation of the microcells may be similarly accomplished by placing a photomask underneath the conductor film/substrate support web and in this case the UV light radiates through the photomask from the bottom and the substrate needs to be transparent to radiation.

Figure 6C:
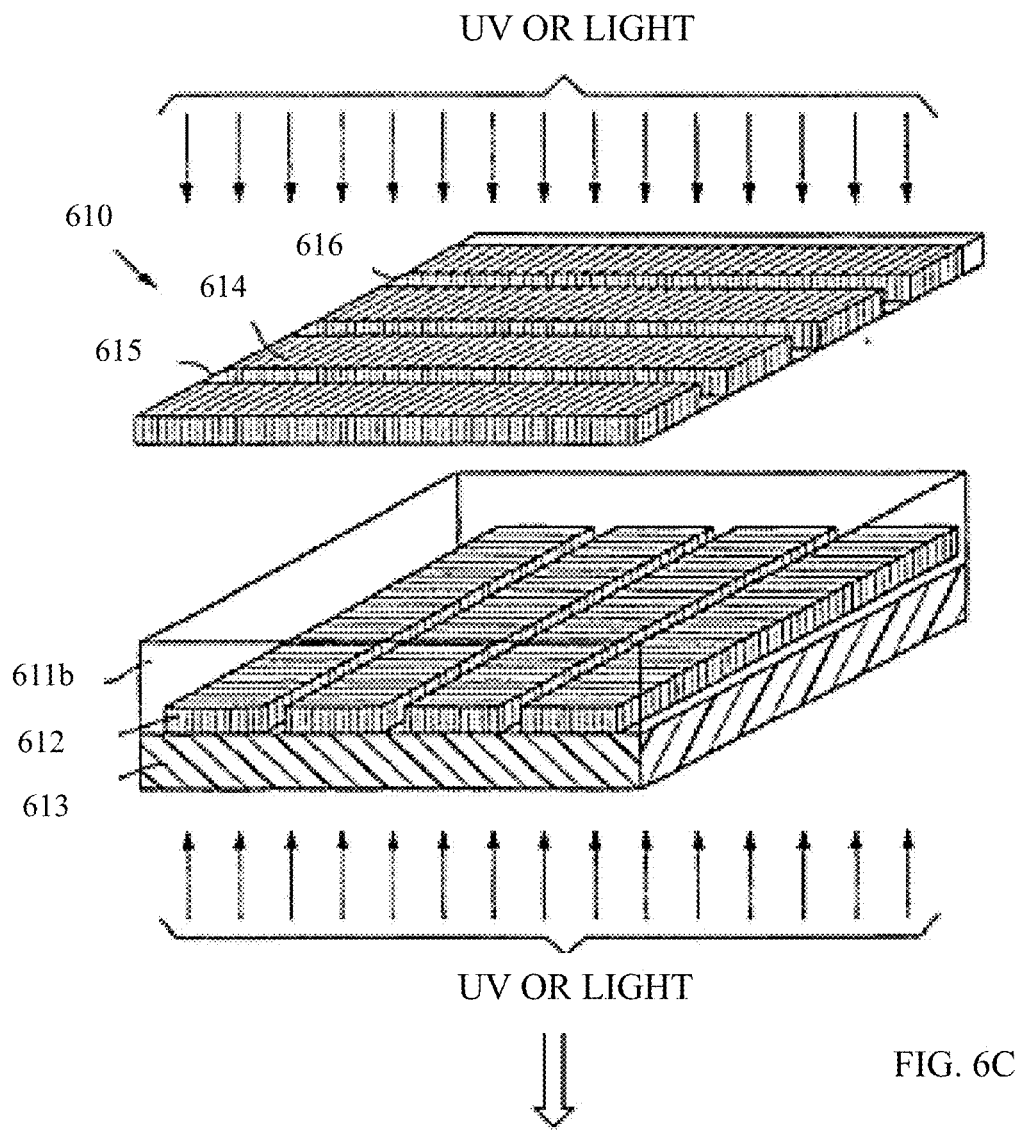
FIGS. 6C and 6D detail an alternate embodiment of the fabrication of microcell arrays using photolithography.
Figure 6D:
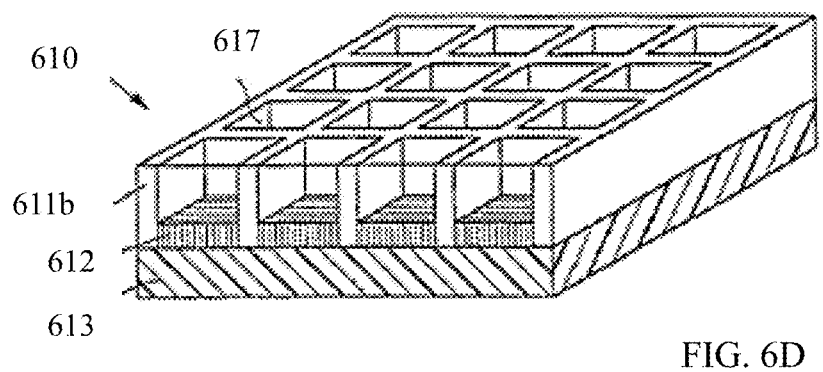

Imagewise Exposure. Still another alternative method for the preparation of the microcell array of the invention by imagewise exposure is illustrated in FIGS. 6C and 6D. When opaque conductor lines are used, the conductor lines can be used as the photomask for the exposure from the bottom. Durable microcell partition walls are formed by additional exposure from the top through a second photomask having opaque lines perpendicular to the conductor lines. FIG. 6C illustrates the use of both the top and bottom exposure principles to produce the microcell array 610 of the invention. The base conductor film 612 is opaque and line-patterned. The radiation curable material 611a, which is coated on the base conductor 612 and substrate 613, is exposed from the bottom through the conductor line pattern 612, which serves as the first photomask. A second exposure is performed from the "top" side through the second photomask 616 having a line pattern perpendicular to the conductor lines 612. The spaces 615 between the lines 614 are substantially transparent to the UV light. In this process, the wall material 611b is cured from the bottom up in one lateral orientation, and cured from the top down in the perpendicular direction, joining to form an integral microcell 617. As shown in FIG. 6D, the unexposed area is then removed by a solvent or developer as described above to reveal the microcells 617.

The microcells may be constructed from thermoplastic elastomers, which have good compatibility with the microcells and do not interact with the media. Examples of useful thermoplastic elastomers include ABA, and (AB)n type of di-block, tri-block, and multi-block copolymers wherein A is styrene, α-methylstyrene, ethylene, propylene or norbornene; B is butadiene, isoprene, ethylene, propylene, butylene, dimethylsiloxane or propylene sulfide; and A and B cannot be the same in the formula. The number, n, is ≥1, preferably 1-10 Particularly useful are di-block or tri-block copolymers of styrene or ox-methylstyrene such as SB (poly(styrene-b-butadiene)), SBS (poly(styrene-b-butadiene-b-styrene)), SIS (poly(styrene-b-isoprene-b-styrene)), SEBS (poly(styrene-b-ethylene-butylenes-b-stylene)) poly(styrene-b-dimethylsiloxane-b-styrene), poly((α-methylstyrene-b-isoprene), poly(α-methylstyrene-b-isoprene-b-α-methylstyrene), poly(α-methylstyrene-b-propylene sulfide-b-α-methylstyrene), poly(α-methylstyrene-b-dimethylsiloxane-b-α-methylstyrene). Commercially available styrene block copolymers such as Kraton I) and G series (from Kraton Polymer, Houston, Tex.) are particularly useful. Crystalline rubbers such as poly(ethylene-co-propylene-co-5-methylene-2-norbornene) or EPDM (ethylene-propylene-diene terpolymer) rubbers such as Vistalon 6505

(from Exxon Mobil, Houston, Tex.) and their grafted copolymers have also been found very useful.

The thermoplastic elastomers may be dissolved in a solvent or solvent mixture, which is immiscible with the carrier in the microcells and exhibits a specific gravity less than that of the carrier. Low surface tension solvents are preferred for the overcoating composition because of their better wetting properties over the microcell partition walls and the fluid. Solvents or solvent mixtures having a surface tension lower than 35 dyne/cm are preferred. A surface tension of lower than 30 dyne/cm is more preferred. Suitable solvents include alkanes (preferably $C_{6-12}$ alkanes such as heptane, octane or Isopar solvents from Exxon Chemical Company, nonane, decane and their isomers), cycloalkanes (preferably $C_{6-12}$ cycloalkanes such as cyclohexane and decalin and the like), alkylbezenes (preferably mono- or di-$C_{1-6}$ alkyl benzenes such as toluene, xylene and the like), alkyl esters (preferably $C_{2-5}$ alkyl esters such as ethyl acetate, isobutyl acetate and the like) and $C_{3-5}$ alkyl alcohols (such as isopropanol and the like and their isomers) Mixtures of alkylbenzene and alkane are particularly useful.

In addition to polymer additives, the polymer mixtures may also include wetting agents (surfactants). Wetting agents (such as the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives, and Silwet silicone surfactants from OSi, Greenwich, Conn.) may also be included in the composition to improve the adhesion of the sealant to the microcells and provide a more flexible coating process. Other ingredients including crosslinking agents (e.g., bisazides such as 4,4'-diazidodiphenylmethane and 2,6-di-(4'-azidobenzal)-4-methylcyclohexanone), vulcanizers (e.g., 2-benzothiazolyl disulfide and tetramethylthiuram disulfide), multifunctional monomers or oligomers (e.g., hexanediol, diacrylates, trimethylolpropane, triacrylate, divinylbenzene, diallylphthalene), thermal initiators (e.g., dilauroryl peroxide, benzoyl peroxide) and photoinitiators (e.g., isopropyl thioxanthone (ITX), Irgacure 651 and Irgacure 369 from Ciba-Geigy) are also highly useful to enhance the physico-mechanical properties of the sealing film by crosslinking or polymerization reactions during or after the overcoating process.

Figure 7A:
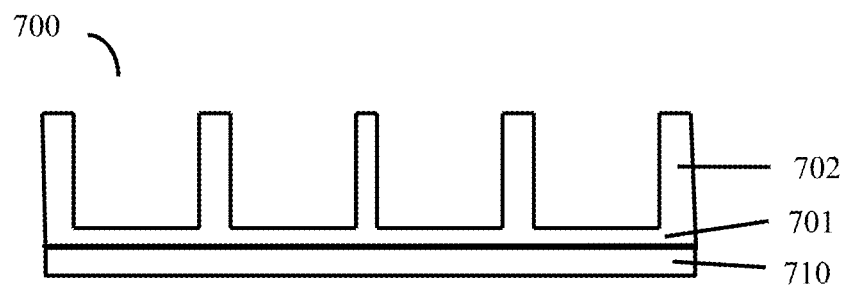
FIGS. 7A-7D illustrate the steps of filling and sealing an array of microcells.
Figure 7B:
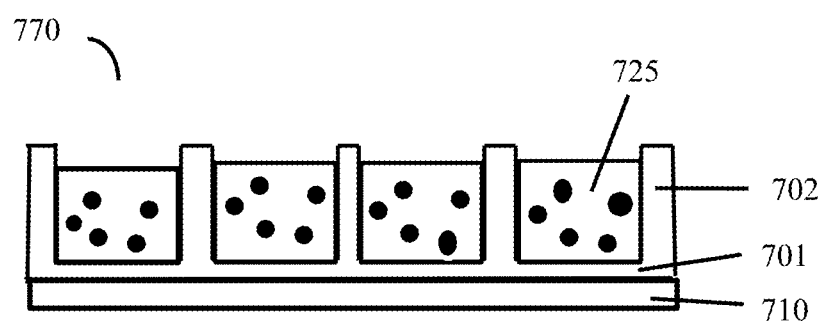

A microcell array, such as the array 700 shown in FIG. 7A may be prepared by any of the methods described above. As shown in cross-section in FIGS. 7A-7D, the microcell partition walls 702 extend upward from microcell bottom 701 and conducive layer 710 to form open microcells In an embodiment, conductive layer 710 is formed on or at microcell bottom 701. While FIGS. 7A-7D show that conductive layer 710 is continuous and running above microcell bottom 701, it is also possible that conductive layer 710 is continuous and running below or within bottom 701 or it is interrupted by microcell partition walls 702.

The microcells are next filled with electrophoretic medium 725, which comprises charged particles in a non-polar fluid to form a plurality of filled microcells 770. The microcells may be filled using a variety of techniques. In some embodiments, blade coating may be used to fill the microcells to the depth of microcell partition walls 702.

Figure 7C:
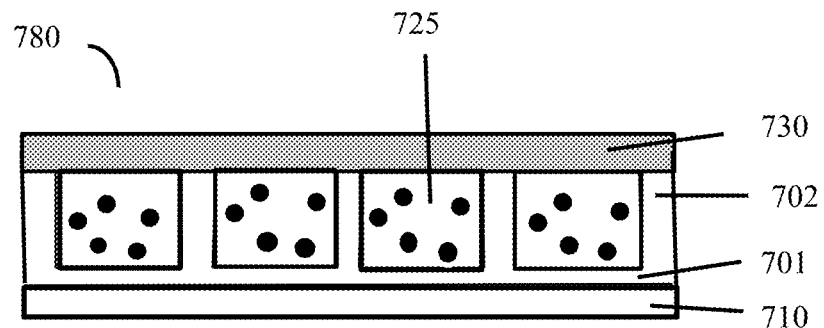

As shown in FIG. 7C, after filling, the microcells are sealed by applying an aqueous sealing composition to form sealed microcells 780, comprising sealing film 730. In some embodiments, the sealing process may involve exposure to heat, dry hot air, or UV radiation. The sealing film must have good barrier properties for the non-polar fluid of electrophoretic medium 725.

In alternate embodiments, a variety of individual microcells may be filled with the desired mixture by using iterative photolithography. The process typically includes coating an array of empty microcells with a layer of positively working photoresist, selectively opening a certain number of the microcells by image-wise exposing the positive photoresist, followed by developing the photoresist, filling the opened microcells with the desired mixture, and sealing the filled microcells by a sealing process. These steps may be repeated to create sealed microcells filled with other mixtures. This procedure allows for the formation of large sheets of microcells having the desired ratio of mixtures or concentrations.

The sealing of the filled microcells may be accomplished in a number of ways. One approach involves the mixing of the aqueous sealing composition with the electrophoretic medium composition. The aqueous sealing composition may be immiscible with the electrophoretic composition, preferably having a specific gravity lower than that of the electrophoretic medium composition. The two compositions, the sealing compositing and the electrophoretic medium composition, are thoroughly mixed and immediately coated onto the plurality of microcells with a precision coating mechanism such as Mayer bar, gravure, doctor blade, slot coating or slit coating. Excess fluid is scraped away by a wiper blade or a similar device. A small amount of a weak solvent or solvent mixture such as isopropanol, methanol or an aqueous solution thereof may be used to clean the residual fluid on the top surface of the partition walls of the microcells. The aqueous sealing composition is subsequently separated from the electrophoretic medium composition and floats on top of the electrophoretic medium liquid composition. Alternatively, after the mixture of the electrophoretic medium composition and the aqueous sealing composition is filled into the microcells, a substrate may be laminated on top to control the metering of the mixture of compositions and to facilitate the phase separation of the aqueous sealing composition from the electrophoretic medium composition to form a uniform sealing film. The substrate used can be a functional substrate in the final structure or can be a sacrifice substrate, for example, a release substrate, which can be removed afterwards. A sealing film is then formed by hardening the aqueous sealing composition in situ (i.e., when in contact with the electrophoretic medium composition). The hardening of the aqueous sealing composition may be accomplished by UV or other forms of radiation, such as visible light, IR, or electron beam. Alternatively, heat or moisture may also be employed to harden the aqueous sealing composition if a heat or moisture curable aqueous sealing composition is used.

In a second approach, the electrophoretic medium composition may be filled into the microcells first and an aqueous sealing composition is subsequently overcoated onto the filled microcells. The overcoating may be accomplished by a conventional coating and printing process, such as blanket coating, inkjet printing or other printing processes. A sealing film, in this approach, is formed in situ, by hardening the aqueous sealing composition by solvent evaporation, radiation, heat, moisture, or an interfacial reaction. Interfacial polymerization followed by UV curing is beneficial to the sealing process. Intermixing between the electrophoretic medium composition and the sealing overcoat is significantly suppressed by the formation of a thin barrier layer at the interface by interfacial polymerization. The sealing is then completed by a post-curing step, for example, by UV radiation. The degree of intermixing may be further reduced by using an aqueous sealing composition that has lower specific gravity than that of the electrophoretic medium composition. Volatile organic solvents may be used to adjust the viscosity and thickness of the sealing overcoat. Rheology of the aqueous sealing composition may be adjusted for optimal sealability and coatability. When a volatile solvent is used in the overcoat, it is preferred that it is immiscible with the solvent in the electrophoretic medium composition.

Figure 7D:
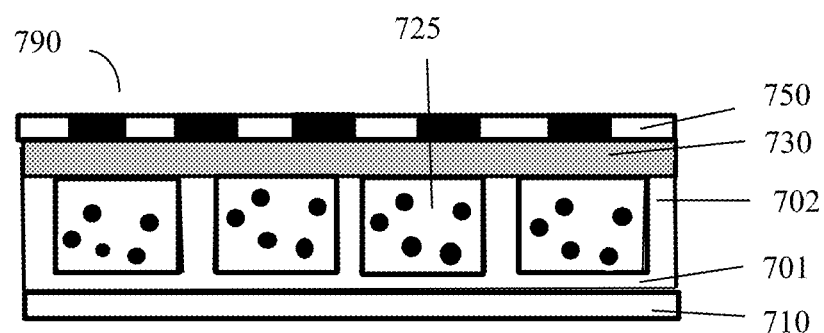

After the microcells are filled and sealed, the sealed microcell array may be laminated with second electrode layer 750 comprising a plurality of electrodes, as shown in FIG. 7I) Second electrode layer 750 is attached onto sealing film 730 to form electro-optic device 790, as shown in FIG. 7D. An adhesive may be used to attach second electrode layer 750 onto sealing film 730. The adhesive layer is not shown in FIG. 7D. The adhesive material of the adhesive layer may be electrically conductive. The adhesive of the adhesive layer, which may be a pressure sensitive adhesive, a hot melt adhesive, or a heat, moisture, or radiation curable adhesive. The laminate adhesive may be post-cured by radiation such as UV through the top conducting layer if the latter is transparent to the radiation. In other embodiments, the plurality of electrodes may be bonded directly to the sealed array of the microcell.

In general, the microcells can be of any shape, and their sizes and shapes may vary. The microcells may be of substantially uniform size and shape in one system. However, it is possible to have microcells of mixed shapes and sizes. The openings of the microcells may be round, square, rectangular, hexagonal or any other shape. The size of the partition area between the openings may also vary. The dimension of each individual microcell may be in the range of about $1\times10^1$ to about $1\times10^6$ µm$^2$, or from about $1\times10^2$ to about $1\times10^6$ µm$^2$, or from about $1\times10^3$ to about $1\times10^5$ µm$^2$.

The depth of the microcells may be in the range of about 5 µm to about 200 µm, or from about 10 µm to about 100 µm. The ratio of the opening area to the total area is in the range of from 0.05 to 0.95, preferably from 0.4 to 0.9.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electro-optic material layer comprises an electrode, the layer on the opposed side of the electro-optic material layer typically being a protective layer intended to prevent the movable electrode damaging the electro-optic material layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating on a plastic film. Separately, a backplane, containing an array of pixel electrodes and an appropriate arrangement of conductors to connect the pixel electrodes to drive circuitry, is prepared. To form the final display, the substrate having the electro-optic material layer is laminated to the backplane using a lamination adhesive.

The aforementioned U.S. Pat. No. 6,982,178 describes a method of assembling a solid electro-optic display, which is well adapted for mass production. Essentially, this patent describes a so-called "front plane laminate" ("FPL") which comprises, in order, a light-transmissive electrode layer; an electro-optic material layer in electrical contact with light-transmissive electrode layer; an adhesive layer; and a release sheet, shown in FIG. 3. Typically, the light-transmissive electrode layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electrophoretic medium, which will normally be viewed through the light-transmissive electrode layer and adjacent substrate (if present); in cases where the electrophoretic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The light-transmissive electrode layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate. Assembly of an electrophoretic display using such a front plane laminate may be effected by removing the release sheet from the front plane laminate and contacting the adhesive layer with the backplane under conditions effective to cause the adhesive layer to adhere to the backplane, thereby securing the adhesive layer, electro-optic material layer, and light-transmissive electrode layer to the backplane. This process is well adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises an electro-optic material layer sandwiched between two adhesive layers, one or both of the adhesive layers being covered by a release sheet, as shown in FIG. 4. Another form of the double release sheet comprises a layer of a solid electro-optic material sandwiched between two release sheets. Both forms of the double release film are intended for use in a process generally similar to the process for assembling an electrophoretic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate may comprise, in order, at least one of a light-transmissive protective layer and a light-transmissive electrode layer; an adhesive layer; an electro-optic material layer; and a release sheet. This inverted front plane laminate is used to form an electro-optic device having a layer of lamination adhesive between the electro-optic material layer and the light-transmissive electrode layer; a second, typically thin layer of adhesive may or may not be present between the electro-optic material layer and a backplane. Such electro-optic displays can combine good resolution with good low temperature performance.

Electrophoretic Medium

The electrophoretic medium, in the context of the present invention, refers to the composition in the microcells. For display applications, the microcells may be filled with at least one type of charged pigment particles in a non-polar fluid. The electrophoretic medium may comprise one type of charged type of particles or more than one type of particles having different colors, charges and charge polarities. The charged particles move through the electrophoretic medium under the influence of an electric field applied across the electro-optic material layer. The charged particles may be inorganic or organic pigments having polymeric surface treatments to improve their stability. The electrophoretic medium may comprise pigments having white, black, cyan, magenta, yellow, blue, green red, and other colors. The electrophoretic medium may also comprise, charge control agents charge adjuvants, rheology modifies, and other additives. Examples of non-polar fluids include hydrocarbons such as Isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoro-ethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-coming (DC-200).

The electrophoretic medium may contain two types of charged particles having different colors, a first type of charged particles having a first charge polarity, and a second type of charged particles that has a second charged polarity opposite to the first charged polarity. The first type of charged particles may be black and the second type of charged particles may be white.

The electrophoretic medium may contain three types of charged particles all having different colors, a first type of charged particles having a first charge polarity, a second type of charged particles having a second charge polarity that is opposite to the first charge polarity, and a third type of charge particles having a third charge polarity that is the same as the first or the second charge polarity. The first type of charged particles may be black, the second type of charged particles may be white, and the third type of charged particles may be selected from the group consisting of red, yellow, blue, cyan, magenta, green, and orange.

The electrophoretic medium may contain four types of charged particles all having different colors, a first type of charged particles having a first charge polarity, a second type of charged particles having the first charge polarity, a third type of charge particles having a second charge polarity opposite to the first charge polarity, and a fourth type of charged particles having the second charge polarity. The magnitude of the charge of the first type of particles may be higher than the magnitude of the charge of the second type of particles, and the magnitude of the charge of the third type of particles may have be higher than the charge of the fourth type of particles. In one example, the first type of charged particles is cyan, the second type of charged particles is magenta, the third type of particles is yellow and the fourth type of charged particles is white.

The electrophoretic medium may contain four types of charged particles all having different colors, a first type of charged particles having a first charge polarity, a second type of charged particles having the first charge polarity, a third type of charge particles having the first charge polarity, and a fourth type of charged particles having a second charge polarity that is opposite to the first charge polarity. The magnitude of the charges of the first, second, and third particles may be different from each other. The magnitude of the charge of the third type of particles may be higher than the magnitude of the charge of the first type of particles that may be higher than the magnitude of the charge of the second type of particles. In one example, the first type of particles is cyan, the second type of particles is magenta, the third type of particles is yellow, and the fourth type of particles is white.

The electrophoretic medium may contain five types of charged particles all having different colors, a first type of charged particles having a first charge polarity, a second type of charged particles having the first charge polarity, a third type of particles having the first charge polarity, a fourth type of particles having a second charge polarity that is opposite to the first charge polarity, and a fifth type of particles having the second charge polarity. The magnitude of the first, second, and third charges may be different from each other. The magnitude of the charge of the third type of particles may be higher than the magnitude of the charge of the first type of particles that may be higher than the magnitude of the charge of the second type of particles. The charge of the fourth type of particles may have higher charge than the fifth type of charged particles. In one example, the first type of particles is cyan, the second type of particles is magenta, the third type of particles is black, the fourth type of particles is yellow, and the fifth type of particles is white.

Sealing Film from an Aqueous Sealing Composition

The sealing film that seals the microcell openings of an electro-optic display must provide barrier to the electrophoretic medium so that the non-polar fluid will not be removed from the plurality of microcells. Furthermore, the sealing film must not negatively affect the electro-optic performance of the device.

One important property of the sealing film is its electrical volume resistivity. If the volume resistivity of the sealing film is too high, a substantial voltage drop will occur within the sealing film, requiring an increase in voltage across the electrodes to operate the device. Increasing the voltage across the electrodes in this manner is undesirable, since it increases the power consumption of the display, and may require the use of more complex and expensive control circuitry to handle the increased voltage. On the other hand, if the volume resistivity of the sealing film is too low, an undesirable cross talk between adjacent pixel electrodes is observed, reducing the image quality (blooming). In addition, because the volume resistivity typically increases rapidly with decreasing temperature, too high volume resistivity of the sealing film negatively affects the low temperature electro-optic performance of the display. The sealing film may have volume resistivity of $10^8$ Ohm·cm or higher. The sealing film may have volume resistivity of from $3.5 \times 10^7$ to $10^{12}$ Ohm·cm or from $10^8$ to $10^{10}$ Ohm·cm. The sealing film may have volume resistivity of $10^{10}$ Ohm·cm or less.

Another important property of the sealing film, other than barrier property and volume resistivity, is its moisture absorption. If the sealing film absorbs significant amount of moisture from the environment over time, the electro-optic performance of the device may become inferior.

The sealing film can be prepared from an aqueous sealing composition comprising a water-soluble poly(vinyl alcohol) homopolymer or poly(vinyl alcohol-co-ethylene) copolymer at a content of from 14 weight % to 55 weight % by weight of the aqueous sealing composition excluding water, a polyurethane at a content of from 6 weight % to 27 weight % of a polyurethane by weight of the aqueous sealing composition excluding water, carbon black at a content of from 5 weight % to 64 weight % by weight of the aqueous sealing composition excluding water, a water-soluble ether at a content of from 1.0 weight % to 40 weight % by weight of the aqueous sealing composition excluding water, and water at a content of from 20 weight % to 95 weight % by weight of the aqueous sealing composition.

The poly(vinyl alcohol) homopolymer has a degree of hydrolysis of from 90% to 99.5%. The poly(vinyl alcohol-co-ethylene) copolymer has a degree of hydrolysis of from 90% to 99.5% and ethylene content of less than 10%. The degree of hydrolysis of the poly(vinyl alcohol) homopolymer and the poly(vinyl alcohol-co-ethylene) copolymer may be from 92% to 99%, or from 92% to 95%. The ethylene content of the poly(vinyl alcohol-co-ethylene) copolymer may be less than 9%, or less than 8.5%, or less than 8%. The degree of hydrolysis of homopolymers and copolymers of polyvinyl alcohols is routinely reported by manufactures of such polymer and it indicates the proportion by units (moles) of vinyl alcohol in the polymer to the total vinyl units. The other units are typically vinyl acetate (ester). The ethylene content of poly(vinyl alcohol-co-ethylene) copolymers is also reported by the manufacturers and represents the proportion of units (moles) of ethylene in the polymer to the other units. In this case, the other unit is vinyl alcohol and vinyl acetate. The poly(vinyl alcohol) homopolymer and the poly(vinyl alcohol-co-ethylene) copolymer of the aqueous sealing composition may have weight average molecular weight of from 1,000 to 1,000,000 Daltons, or from 10,000 to 500,000 Daltons, or from 20,000 to 400,000 Daltons.

The content of the water-soluble poly(vinyl alcohol) homopolymer or poly(vinyl alcohol-co-ethylene) copolymer in the aqueous sealing composition may be from 14 weight % to 53 weight %, or from 25 weight % to 50 weight %, or from 30 weight % to 48 weight %, or from 33 weight % to 46 weight % by weight of the aqueous sealing composition excluding water.

Polyurethanes are typically prepared via a polyadditional process involving a diisocyanate. Non-limiting examples of polyurethanes include polyether polyurethanes, polyester polyurethanes, polycarbonate polyurethanes, polyether polyureas, polyureas, polyester polyureas, polyester polyureas, polyisocyanates (e.g., polyurethanes comprising isocyanate bonds), and polycarbodiimides (e.g., polyurethanes comprising carbodiimide bonds). Generally, the polyurethane contains urethane groups. The polyurethanes utilized in the aqueous sealing compositions and sealing films described herein may be prepared using methods known in the art. The polyurethanes of the aqueous sealing composition of the present inventions are polyester polyurethanes, polycarbonate polyurethanes, and mixtures thereof. The polyurethane of the aqueous sealing composition may have weight average molecular weight of from 1,000 to 2,000,000 Daltons, or from 10,000 to 300,000 Daltons, or from 15,000 to 200,000 Daltons. The polyurethane may be added in the aqueous sealing composition as an aqueous solution or an aqueous dispersion or an aqueous emulsion, or a latex.

The content of the polyurethane in the aqueous sealing composition may be from 7 weight % to 27 weight %, or from 9 weight % to 24 weight %, or from 11 weight % to 22 weight %, or from 12 weight % to 20 weight % by weight of the aqueous sealing composition excluding water.

The aqueous sealing composition may comprise a crosslinker (or otherwise called, crosslinking agent) from 0.1 weight % to 8 weight % of a crosslinker by weight of the aqueous sealing composition excluding water. During the curing of the aqueous sealing composition to prepare a sealing film, the crosslinker forms chemical bonds between the polyurethane of the aqueous sealing composition and potentially with the polymer molecules of the microcells, increasing the adhesion between the sealing film and the microcells. The crosslinker is preferably soluble or dispersible in the aqueous carrier of the aqueous sealing composition. The crosslinker may be a monomer, an oligomer or a polymer. Examples of crosslinkers include polyisocyanates, multifunctional polycarbodiimides, multifunctional aziridines, silane coupling agents, boron/titanium/zirconium-based crosslinkers, or melamine formaldehydes. Polycarbodiimide crosslinkers are reactive at acidic pH conditions. Preferably, the crosslinker is free of sulfosuccinate surfactants. The content of the crosslinker in the aqueous sealing composition may be from 0.1 weight % to 5 weight %, or from 0.2 weight % to 4 weight %, or from 0.3 weight % to 3.5 weight %, or from 0.5 weight % to 3 weight percent, or from 0.8 weight % to 2.6 weight % by weight of the aqueous sealing composition excluding water.

The inventors of the present invention found that aqueous sealing compositions comprising a combination of a water-soluble poly(vinyl alcohol) homopolymer or poly(vinyl alcohol-co-ethylene) copolymer and a polyurethane, wherein the interfacial tension between the water-soluble poly(vinyl alcohol) polymer or poly(vinyl alcohol-co-ethylene) copolymer and the polyurethane is less than 2 mN/m, can form sealing films with excellent performance.

Extensive experimental work also revealed that excellent performance was also observed from aqueous sealing compositions comprising a combination of a water-soluble poly(vinyl alcohol) homopolymer or poly(vinyl alcohol-co-ethylene) copolymer and a polyurethane, wherein the polar component of the surface energy of the polyurethane is from 10 to 20 mN/m.

The aqueous sealing composition may also comprise a conductive filler at a content of from 5 weight % to 64 weight % by weight of the aqueous sealing composition excluding water. The filler of the aqueous sealing composition may be selected from the group consisting of carbon black, graphene, graphite, and carbon nanotubes. The filler decreases the volume resistivity of the sealing film, but it may also affect other properties of the layer such as its surface energy. In order to be effective as a filler, carbon black must have good dispersibility in the aqueous sealing composition. The content of conductive carbon black in the aqueous sealing composition may be from 10 weight % to 55 weight %, or from 20 weight % to 50 weight %, or from 25 weight % to 45 weight %, or from 30 weight % to 40 weight % of the aqueous sealing composition.

The oil adsorption value of the carbon black used in the aqueous sealing composition may be 100 cm$^3$ or less per 100 mg of carbon black. The value of oil adsorption is typically reported by carbon black manufacturers as OAN, measured using the method according to ASTM 2414. It represents the degree of structure and aggregation of the carbon black particles. That is, the larger the OAN, the higher the structure of the carbon black particles (connected with each other and having branched structures) and/or the higher the degree of aggregation of the particles. More structured/aggregated carbon black may generally provide higher conductivity to the sealing film, although conductivity may also depend on the dispersibility of the filler, with higher OAN indicating that it may be more difficult to disperse the carbon black. The carbon black filler of the aqueous sealing composition may have preferably average diameter of primary particles larger than 30 nm. This is another physical property of carbon black grades that may be reported by carbon black manufacturers. Primary particles may be determined by electron microscopy. Typically, carbon black having very small average diameter of primary particles are difficult to disperse. The carbon black may have total surface area less than 80 m$^2$/g, or less than 75 m$^2$/g, or less than 70 m$^2$/g. This is another common physical property that is routinely reported by carbon black manufacturers. It is measured using the nitrogen adsorption method according to ASTM D 6556. The carbon black may have volume resistivity higher than 0.1 Ohm·cm, measured in the powder form at pressure of 40 MPa using method ASTM D 2663.

The total surface energy of the conductive carbon black of the aqueous sealing composition may be higher than 40 mN/m, or higher than 55 mN/m, determined with the Washburn method, using hexane as test liquid. The total surface energy of the conductive carbon black of the aqueous sealing composition may be from 40 mN/m to 80 mN/m, or from 40 mN/m to 70 mN/m, or from 40 mN/m to 65 mN/m. The dispersive component of the surface energy of the conductive carbon black may be higher than 15 mN/m, determined with the Washburn method using hexane as test liquid. The dispersive component of the conductive filler may be from 15 mN/m to 40 mN/m, or from 15 mN/m to 30 mN/m.

The aqueous sealing composition comprises a water-soluble ether from 1.0 weight % to 40 weight % by weight of the aqueous sealing composition excluding water. The aqueous sealing composition may comprise the water-soluble ether from 1.5 weight % to 35 weight %, or from 2.0 weight % to 30 weight %, or from 2.5 weight % to 25 weight %, or from 4.0 weight % to 22 weight %, or from 5.0 weight % to 20 weight % by weight of the aqueous sealing composition excluding water. The content of the water-soluble ether in the aqueous sealing composition may be higher than 1.7 weight %, or higher than 2 weight %, or higher than 3 weight %, or higher than 4 weight %, or higher than 5 weight %, or higher than 6 weight %, or higher than 7 weight %, or higher than 8 weight %, or higher than 10 weight %, or higher than 12 weight %, or higher than 15 weight % by weight of the aqueous sealing composition excluding water. The content of the water-soluble ether in the aqueous sealing composition may be lower than 40 weight %, or lower than 30 weight %, or lower than 25 weight % by weight of the aqueous sealing composition excluding water.

The water-soluble ether has weight average molecular weight of from 75 to 5,000 Dalton. The water-soluble ether may have weight average molecular weight of from 85 to 3,000 Daltons, or from 90 to 1,000 Daltons, or from 90 to 500 Daltons, or from 90 to 300 Daltons. The water-soluble ether may have weight average molecular weight higher than 75, or higher than 90 or higher than 100, or higher than 200. The water-soluble ether may have weight average molecular weight lower than 5,000, or lower than 3,000, or lower than 1,000, or lower than 500, or lower than 300, or lower than 200, or lower than 150.

The water-soluble ether is a polar compound that is soluble in water and polar organic solvents. The water-soluble ether may be represented by Formula I, Formula II, or Formula III.

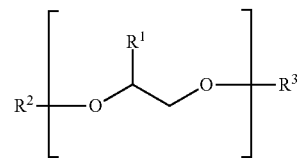

Formula I

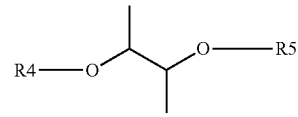

Formula II

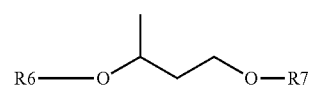

Formula III

The value of n is from 1 to 145. The value of n may be from 1 to 100, or from 1 to 50, or from 1 to 20, or from 1 to 10, or from 1 to 5, or from 1 to 4, or from 1 to 3, or from 1 to 2. R1 is hydrogen, methyl or ethyl group; R2, R3, R4, R5, R6, and R7 are selected independently from the group consisting of hydrogen, linear or branched alkyl group comprising from 1 carbon atom to 6 carbon atoms, phenyl, and benzyl group. Formula I comprises at least one ether functional group. Formula II comprises at least one ether functional group. Formula III comprises at least one ether functional group.

The water-soluble ether may be selected from the group consisting of ethylene glycol monomethyl ether, ethylene glycol monoethyl ether, ethylene glycol mono-n-propyl ether, ethylene glycol monoisopropyl ether, ethylene glycol n-monobutyl ether, ethylene glycol monoisobutyl ether, ethylene glycol mono-t-butyl ether, ethylene glycol monobenzyl ether, ethylene glycol monophenyl ether, ethylene glycol dimethyl ether, ethylene glycol diethyl ether, ethylene glycol di-n-propyl ether, ethylene glycol diisopropyl ether, diethylene glycol monomethyl ether, diethylene glycol monoethyl ether, diethylene glycol mono-n-propyl ether, diethylene glycol monoisopropyl ether, diethylene glycol n-monobutyl ether, diethylene glycol monoisobutyl ether, diethylene glycol mono-t-butyl ether, diethylene glycol monobenzyl ether, diethylene glycol monophenyl ether, diethylene glycol dimethyl ether, diethylene glycol diethyl ether, diethylene glycol ethyl methyl ether, diethylene glycol di-n-propyl ether, diethylene glycol diisopropyl ether, diethylene glycol di-n-butyl, triethylene glycol monomethyl ether, triethylene glycol monoethyl ether, triethylene glycol mono-n-propyl ether, triethylene glycol monoisopropyl ether, triethylene glycol n-monobutyl ether, triethylene glycol monoisobutyl ether, triethylene glycol mono-t-butyl ether, triethylene glycol monobenzyl ether, triethylene glycol monophenyl ether, triethylene glycol dimethyl ether, triethylene glycol diethyl ether, triethylene glycol di-n-propyl ether, triethylene glycol diisopropyl ether, tetraethylene glycol monomethyl ether, tetraethylene glycol monoethyl ether, triethylene glycol monophenyl ether, tetraethylene glycol dimethyl ether, polyethylene glycol monomethyl ether, polyethylene glycol monoethyl ether, polyethylene glycol monophenyl ether, propylene glycol monomethyl ether, propylene glycol monoethyl ether, propylene glycol mono-n-propyl ether, propylene glycol monoisopropyl ether, propylene glycol mono-n-butyl ether, propylene glycol monoisobutyl ether, propylene glycol monophenyl ether, propylene glycol dimethyl ether, propylene glycol diethyl ether, dipropylene glycol monomethyl ether, dipropylene glycol monoethyl ether, dipropylene glycol mono-n-propyl ether, dipropylene glycol monoisopropyl ether, dipropylene glycol mono-n-butyl ether, dipropylene glycol monoisobutyl ether, dipropylene glycol dimethyl ether, dipropylene glycol diethyl ether, dipropylene glycol di-n-propyl ether, dipropylene glycol diisopropyl ether, tripropylene glycol monomethyl ether, tripropylene glycol monoethyl ether, tripropylene glycol mono-n-propyl ether, tripropylene glycol monoisopropyl ether, tripropylene glycol mono-n-butyl ether, tripropylene glycol monoisobutyl ether, or mixtures thereof.

The aqueous sealing composition may also comprise a rheology modifier at a content of from 0.05 weight % to 10 weight %, or from 0.05 weight % to 5 weight %, or from 0.1 weight % to 3 weight % by weight of the aqueous sealing composition excluding water. The rheology modifier increases the stability of the aqueous sealing composition during its storage. It also facilitates film formation, improve sealing stability, and provide other functions. Examples include associative thickeners, alkali swellable acrylic emulsions, and other polymeric thickeners. The aqueous sealing composition may be shear thinning, that is to say, its viscosity is reduced at higher shear. For example, the rheology profile of the aqueous sealing composition may shows a reduction of the viscosity between viscosity at shear rate of $10^{-4}$ 1/s and the viscosity at shear rate of $10^2$ 1/s by 5 times to 10,000 times. The sealing film may also comprise a rheology modifier at a content of from 0.05 weight % to 10 weight %, or from 0.05 weight % to 5 weight %, or from 0.1 weight % to 3 weight % by weight of the sealing film.

The aqueous sealing composition may also comprise a wetting agent, also called surfactant. Non-limiting examples of wetting agents include FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives, and Silwet silicone surfactants from OSi, Greenwich, Conn. Wetting agents may increase the affinity between the sealing film and the microcells, enhance the interfacial area between them, and improve the adhesion of the sealing film to the microcells and provide a more flexible coating process. The content of the wetting agent in the aqueous sealing composition may be from 0.01 weight % to 3.0 weight %, or from 0.04 weight % to 2.0 weight %, or from 0.06 weight % to 1.0 weight %, or from 0.07 weight % to 0.8 weight % by weight of the aqueous sealing composition excluding water. The sealing film may comprise a wetting agent. The content of the wetting agent in the sealing film may be from 0.01 weight % to 3.0 weight %, or from 0.04 weight % to 2.0 weight %, or from 0.06 weight % to 1.0 weight %, or from 0.07 weight % to 0.8 weight % by weight of the sealing film.

The aqueous sealing composition may comprise water from 20 weight % to 95 weight %, or from 50 weight % to 94 weight %, or from 70 weight % to 92 weight %, or from 75 weight % to 90 weight %, or from 80 weight % to 88 weight %, by weight of the aqueous sealing composition.

The aqueous sealing composition may also comprise a pH adjusting agent. The pH adjusting agent is added into the aqueous sealing composition to adjust its pH to a value of from 6.5 to 8.5. An example of a pH adjusting agent is ammonium hydroxide, but a variety of acids and bases can be used. The pH adjusting agent increases the pH of the aqueous sealing composition, which may decrease the rate of crosslinking of the aqueous sealing composition before its use, and also provides optimum pH condition for the rheology modifier to interact with the particles of the aqueous sealing composition, improving its efficacy. The pH adjusting agent may be used at a content of from 0.2 weigh % to 1 weight % by weight of the aqueous sealing composition excluding water.

The aqueous sealing composition can be used to form a sealing film by application of the aqueous sealing composition and drying or curing the aqueous sealing composition. The sealing film may comprise most of the ingredients of the aqueous sealing composition. If the aqueous composition comprises a crosslinker, the crosslinker is incorporated into the polyurethane polymer of the sealing film during curing. In addition, the water of the sealing composition is evaporated during the drying or curing of the aqueous sealing composition towards the preparation of the sealing film. Experimental data show that approximately 37 weight % of the initially added water-soluble ether is also evaporated during the drying or curing and approximately only 63 weight % of the initially added water-soluble ether content of the aqueous sealing composition is present in the sealing film. If there is any residual or absorbed water or moisture in the sealing film, the disclosed contents of the components of the sealing film are calculated as weight % of the component by weight of the aqueous sealing composition excluding the residual or absorbed water, unless otherwise stated.

The sealing film comprises a water-soluble poly(vinyl alcohol) homopolymer or poly(vinyl alcohol-co-ethylene) copolymer at a content of from 15 weight % to 60 weight % by weight of the sealing film, wherein the poly(vinyl alcohol) homopolymer has a degree of hydrolysis of from 90% to 99.5%, and wherein the poly(vinyl alcohol-co-ethylene) copolymer has a degree of hydrolysis of from 90% to 99.5% and ethylene content of less than 10%. The sealing film also comprises a polyurethane at a content of from 7 weight % to 29 weight % by weight of the sealing film, carbon black at a content of from 5 weight % to 70 weight % by weight of the sealing film, and a water-soluble ether at a content of from 0.5 weight % to 25 weight % by weight of the sealing film. The water-soluble ether may have molecular weight of from 90 to 5,000 Dalton. The water-soluble ether may optionally comprise a hydroxyl group.

The physical and chemical properties of the various classes of the components of the sealing film have been described in detail above.

The content of the water-soluble poly(vinyl alcohol) homopolymer or poly(vinyl alcohol-co-ethylene) copolymer in the sealing film may be from 16 weight % to 55 weight %, or from 28 weight % to 52 weight %, or from 33 weight % to 50 weight %, or from 35 weight % to 48 weight % by weight of the sealing film.

The content of the polyurethane in the sealing film may be from 8 weight % to 29 weight %, or from 10 weight % to 26 weight %, or from 12 weight % to 24 weight %, or from 14 weight % to 22 weight % by weight of the sealing film.

The sealing film may comprise conductive carbon black at a content of from 11 weight % to 60 weight %, or from 24 weight % to 55 weight %, or from 29 weight % to 50 weight %, or from 30 weight % to 45 weight % by weight of the sealing film.

The sealing film comprises a water-soluble ether at a content of from 0.5 weight % to 25 weight % by weight of the sealing film. The sealing film may comprise the water-soluble ether at a content of from 0.8 weight % to 20 weight %, or from 1.0 weight % to 18 weight %, or from 1.2 weight % to 20 weight %, or from 1.5 weight % to 18 weight %, or from 2.0 weight % to 16 weight % by weight of the sealing film. The content of the water-soluble ether in the sealing film may be higher than 0.5 weight %, or higher than 0.6 weight %, or higher than 0.7 weight %, or higher than 0.8 weight %, or higher than 0.9 weight %, or higher than 1 weight %, or higher than 1.5 weight %, or higher than 2.0 weight %, or higher than 3.0 weight %, or higher than 4 weight % by weight of the sealing film. The content of the water-soluble ether in the sealing film may be lower than 25 weight %, or lower than 20 weight %, or lower than 18 weight %, or lower than 15 weight %, or lower than 12 weight %, or lower than 10 weight % by weight of the sealing film.

The sealing film prepared by the aqueous sealing composition can be used for sealing the microcells of an electro-optic device. The electro-optic device comprises a conductive layer, a microcell layer comprising a plurality of microcells, each microcell including an opening, each microcell comprising an electrophoretic medium, the electrophoretic medium comprising charged particles in a non-polar carrier, a sealing film, the sealing film spanning the opening of each microcell, an adhesive layer; and an electrode layer.

In general, the sealing film of electro-optic devices plays an important role in the display performance. Inferior barrier property of a sealing film results in non-polar fluid of the electrophoretic medium escaping from the electro-optic material layer over time, which leads to a severe deteriorating the electro-optic performance of the display. It was observed that increasing the content of poly(vinyl alcohol) homopolymer or poly(vinyl alcohol-co-ethylene) copolymer of the sealing film improves its barrier properties. However, sealing films having high content of poly(vinyl alcohol) homopolymer or poly(vinyl alcohol-co-ethylene) copolymer increase its moisture absorption, which is also undesirable.

The inventors of the present invention surprisingly found that optimum electro-optic performance in terms of color gamut can be achieved when the sealing film comprises a combination of poly(vinyl alcohol) homopolymer or poly (vinyl alcohol-co-ethylene) copolymer and polyurethane, a conductive carbon black, and a water-soluble ether having molecular weight of from 75 to 5,000 Dalton. The addition of the water-soluble ether in the aqueous sealing composition and the sealing film is believed to reduce the electrical resistance of the interface of the sealing film and one or both the adjacent layers, such as the sealing film-adhesive interface and the sealing film-electrophoretic medium interface. This reduction of the electrical resistance of the interface was experimentally shown with volume resistivity measurements and also with Electrical Impedance Spectroscopy experiments, as shown in the Examples Section. Importantly, this electrical resistance of the interface did not affect the electrical conductivity of the sealing film itself. In fact, as the data showed, the inventive sealing film has higher volume resistivity than that of a control film that comprise no water-soluble ether. As mentioned above, higher volume resistivity of the sealing film contributes to lower blooming, which is well known phenomenon in the electro-optic field.

Improved performance is also observed when a combination of poly(vinyl alcohol) homopolymer or poly(vinyl alcohol-co-ethylene) copolymer and polyurethane is used, wherein the interfacial tension between the poly(vinyl alcohol) polymer or poly(vinyl alcohol-co-ethylene) copolymer and the polyurethane is less than 2 mN/m. Furthermore, the inventors of the present invention surprisingly found that optimum performance is also observed when a combination of poly(vinyl alcohol) homopolymer or poly(vinyl alcohol-co-ethylene) copolymer and polyurethane is used, wherein the polar component of the surface energy of the polyurethane is from 10 to 20 mN/m.

These and other aspects of the present invention will be further appreciated upon consideration of the following Examples, which are intended to illustrate certain particular embodiments of the invention but are not intended to limit its scope, as defined by the claims.

Examples

Methods of Evaluation of Sealing Films

A. Example of Preparation of the Aqueous Sealing Compositions:

A1. Example of preparation of carbon black dispersion. An aqueous solution of poly(vinyl alcohol) homopolymer or poly(vinyl alcohol-co-ethylene) copolymer was prepared containing 20 weight % of the polymer by volume of the solution. In one example, the polymer is poly(vinyl alcohol-co-ethylene) copolymer (Exceval™ RS-1717, supplied by Kuraray). That is, the solution contains 200 g of polymer per liter of the solution. The carbon black powder is mixed with the aqueous solution of the poly(vinyl alcohol) homopolymer or poly(vinyl alcohol-co-ethylene) copolymer. In one example, an aqueous solution comprising 106 g of poly (vinyl alcohol-co-ethylene) copolymer was mixed with 162 g of carbon black (Nerox® 3500, supplied by Orion Engineered Carbon). The dispersion was mixed in an overhead mixer (Hei-Torque Value 200) for 30 minutes at 300 rpm. The dispersion was then recirculated in a Generation 1 Q1375 Flocell Sonicator, wherein the jacket of the sonicator is cooled using chilled water of 10° C., and at 100% amplitude for 3 hours and 23 minutes. The dispersion was continuously stirred until it was used to prepare the sealing composition.

A2. Example of Preparation of Aqueous Sealing Composition.

Into a container, an aqueous polyurethane dispersion were combined with a wetting agent, and an aqueous solution of poly(vinyl alcohol) homopolymer or poly(vinyl alcohol-co-ethylene) copolymer. In one example, 194 g of 35 weight % polyurethane aqueous dispersion (L3838 aqueous dispersion, supplied by Hauthaway), were mixed with 372 g of an aqueous solution of poly(vinyl alcohol-co-ethylene) copolymer (containing 20 weight % of copolymer by volume of the solution). In the example, the poly(vinyl alcohol-co-ethylene) copolymer was Exceval™ RS-1717, supplied by Kuraray. The mixture was mixed for 10 minutes at 90 rpm using a Hei-torque Value 200 overhead mixer. Then, the appropriate amount of dipropylene glycol dimethyl ether (45 g in one example) was added over 5 minutes while continuing to mix at 90 rpm. The resulting mixture was mixed at 90 rpm for an additional 10 minutes and the appropriate amount of a crosslinker was added. The mixture was mixed for an additional 60 minutes at 90 rpm. The appropriate amount of the carbon black dispersion prepared in A1 was added (in one example 1.39 L) and the resulting dispersion was mixed for 60 minutes at 500 rpm. The pH was then adjusted to 6.5-8.5 using ammonium hydroxide and the dispersion was mixed for an additional 30 minutes. The appropriate amount of a rheology modifier was added into the dispersion dropwise and the mixing continued for another 60 minutes. Then, the dispersion was degassed under reduced pressure (25 mmHg) for 5 days. The resulting aqueous sealing composition was used for the preparation of a sealing film of the corresponding device within 7 days of the preparation of the sealing composition.

B1. Example of Preparation of Sealing Film Using a Drawdown Method.

The sealing composition prepared in A2 above was coated on the Indium-Tin Oxide (ITO) side of an ITO-PET film using a Gardco drawdown coater. A 15-mil gap and an eight path square applicator was used. The drawdown speed was set at 2 m/min to target a dry film thickness of 30+/−2 μm. The coating was dried at a 100° C. oven for 15 minutes. The dried film was conditioned at 25° C. and 55% RH for 24 hours.

B2. Example of Preparation of Sealing Film Using a Roll-to-Roll Coating Line.

A sealing composition prepared in A2 above was coated on the Indium Tin Oxide (ITO) side of an ITO-PET thin film at dry thickness of 30 μm, using a slot die in a roll-to-roll coating line at the speed of 9 ft/min. The film travelled through a convention oven consisting of four heating zones at a speed of 9 ft/min. Each heating zone had a length of 5 feet. The first zone was set at temperature of 80° C., and the rest heating zones were set at temperature of 100° C. Once the dried sealing film on ITO-PET has passed through the drying ovens, the film is cut into 3 sections, each approximately 24-30 inches in length and placed in a cleanroom controlled environment at temperature of 25° C. and 55% Relative Humidity (RH).

C. Determination of Volume Resistivity—TCBC Method.

Sealing film that was prepared by Method B2 described above (Method of Preparation of Sealing Films) was evaluated for volume resistivity. "TCBC Method" was used to describe the Transient Current Background Current method of measuring volumetric resistivity. For the determination of volume resistivity, Labview 2014 software and TCBC waveform program, NI USB 6211 multifunction device, and Model 603 Power Amplifier were used. The equipment allows the user to measure the volumetric resistivity of electrode laminated samples by applying a waveform at a preset voltage and measuring the output current to calculate resistance. The method included (a) the preparation of a sealing film according to the "Method of Preparation of Sealing Films" B2 disclosed above, (b) the lamination method with conductive adhesive and graphite backplane of the sealing film and (c) and test method using the waveform program and setup. The thickness of the film was measured using the Model S112EXB thickness gauge from Mitutoyo. After the lamination process, the sample was conditioned for 10 days at 25° C./55% RH prior to testing. The displayed resistance and measured thickness was then used to calculate the volume resistivity using the following equation $r=R/t$ where r is resistivity, R is resistance, and t is thickness.

Figure 8A:
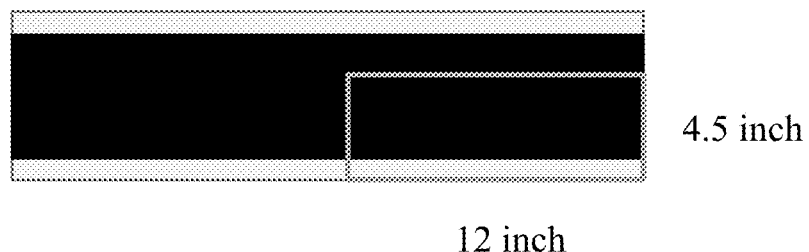
FIGS. 8A-8D illustrate various components that are constructed for the evaluation of volume resistivity of sealing films.

One panel of each sealing coated on ITO-PET from the roll-to-roll coating line described in method B2 above was collected. The sealing was cut into a 12 inch length piece. The 12 inch length piece was cut to 4.5 inches in width as shown in the image of FIG. 8A. The excess ITO on the edge was not trimmed off.

Figure 8B:
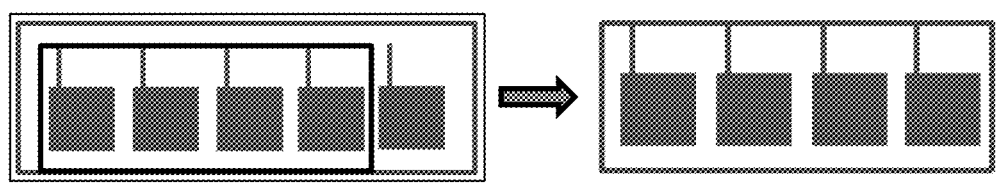

Graphite Backplanes Preparation: One sheet of graphite backplanes (5 pixels) for each sealing film was collected for testing. One of the pixels from the end was cut off, so that only 4 pixels remained. The top and side edges were trimmed (where the pixel lines extend) as shown in the image of FIG. 8B. The other side edge was not trimmed.

Figure 8C:

KA2 Film Preparation: A long roll of qualified 6 μm thick KA2 conductive adhesive film was collected to be used for testing. The KA2 film was cut into 3 inch width pieces. The 3 inch width pieces were cut to 10 inches in length as shown in the image of FIG. 8C. Only one side was cut, so that the release liner overhang was left on the other side.

Figure 8D:
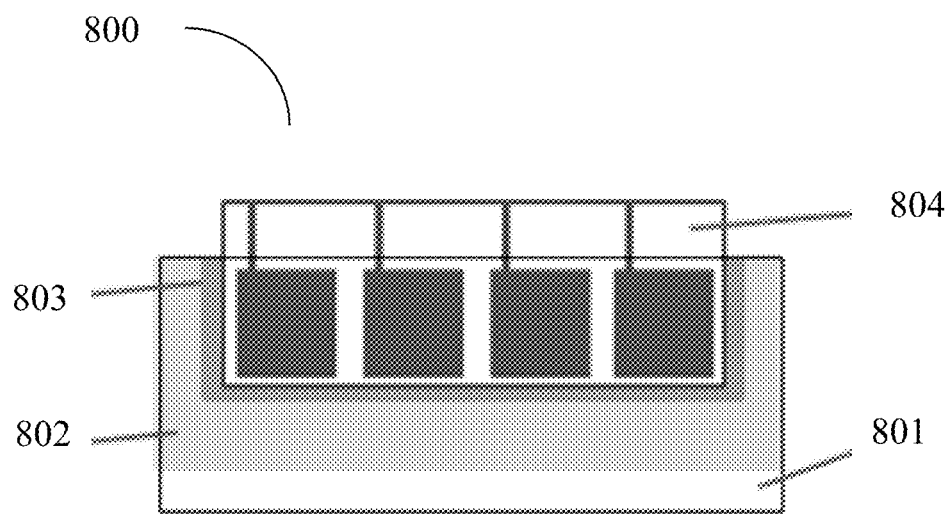

Laminating TCBC Sample: A conductive adhesive KA2 having a thickness of 6 μm was laminated onto the dried sealing film via a hot roll laminator. For this lamination, the bottom plate and the top roller of the laminator was set to 80° C. and the speed of the lamination was set to 17 mm/sec. The cut KA2 film was taped to the cut sealing with the protective sheet on the KA2 touching the sealing. The bottom and right edge of the KA2 film were aligned to the bottom and right edge of the sealing. The top of the KA2 film was taped to the sealing. The top of the sealing was taped to the laminator plate so that the top edge of the sealing was directly under the center of the roller. While holding the top sheet with KA2, the KA2 protective sheet was gently removed. While still holding the KA2, lamination started, allowing the roller to press the KA2 slowly onto the sealing. After lamination was done, the tape was removed and layer was released from the KA2. The graphite backplane was carefully placed onto the KA2. The electrodes were centered on the KA2. The sample was laminated, and the final preparation is illustrated in FIG. 8D. The final TCBC sample 800 included ITO/PET conductive film 801, sealing film 802, KA2 adhesive 803, and graphite backplane 804. A region of the conductive film 801 and a first testing point of graphite backplane 804 were electrically connected via a voltage source. The sample was then conditioned at 25° C./55% RH for 10 days to ensure thorough humidification.

Figure 8E:
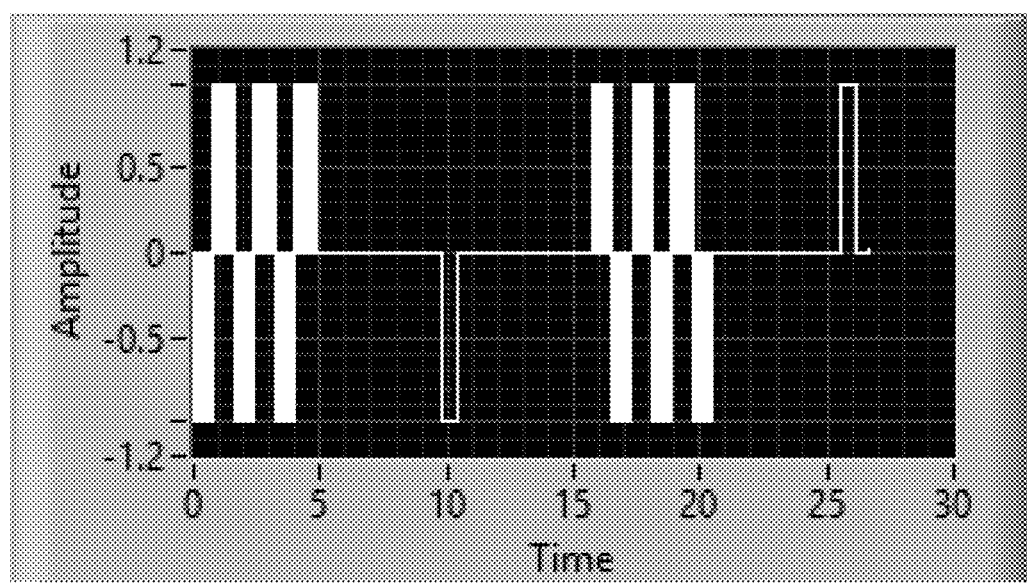
FIG. 8E illustrates a waveform that is used for the evaluation of volume resistivity of sealing films

Testing of TCBC Sample: After conditioning for 10 days at 25° C./55% RH, the sample was ready for testing. Testing of the sample also occurred in a controlled environmental chamber set to 25° C./55% RH to minimize variability due to temperature or relative humidity. To run the TCBC test, began by opening up the corresponding software. A ½ inch segment of sealing was peeled off from the side of the sample to expose the ITO-PET surface. On the computer with Windows 10, the TCBC resistivity program was opened, which uses Labview 2014 and the TCBC waveform program. The area of contact of the single pixel region used to measure the resistivity of the sample was set to 25 cm². The range was set to 200 μA (which also matched the model 6487 Electrometer). One alligator clip was connected to the ITO-PET of the sealing resistivity sample. The other alligator clamp was connected to the first test pixel of the graphite backplane. Once the connections were set, the test was initiated. During the test, the following waveform below was ran, pulsing to a magnitude of 15 volts for a total time of 26699 ms as illustrated in FIG. 8E. During this time, the software program and electrometer measured the current as a function of time. The software then calculated the resistance of the sample from the measured current and inputted voltage based on Ohm's Law: R=(V/I), where V is the inputted voltage, I is the measured current and R is the resistance. To calculate the final volume resistivity of the sample, use the following equation: r=R/t, where R is the resistance from the test, and t is the thickness measured of the sealing film using the thickness gauge to complete the test.

D. Electrical Impedance Spectroscopy (EIS):

Electrical Impedance Spectroscopy (EIS) was used to understand how the presence of water-soluble ether (dipropylene glycol dimethyl ether) in the sealing film affects the electro-optic performance without increasing the volume resistivity of the film. EIS determined the interfacial resistivity between the sealing film and the electrophoretic medium (comprising a nonpolar solvent and charged yellow pigment particles).

Figure 9:
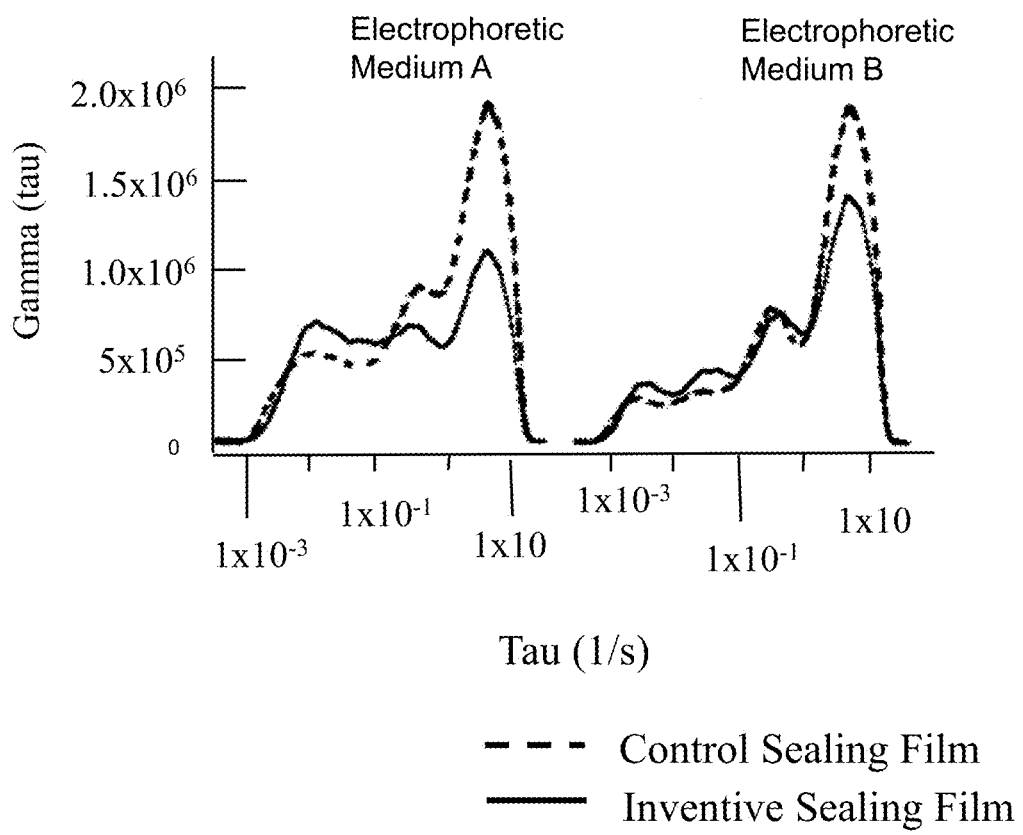
FIG. 9 shows Electrical Impedance Spectroscopy results of control and inventive sealing films.

Using EIS results, distribution of the relaxation time (DRT) was calculated. FIG. 9 shows the graphs of gamma value versus relaxation time (tau) from EIS data of inventive sealing film (comprising water-soluble ether) versus control sealing film (not comprising water-soluble ether) for two different electrophoretic media A and B. The different peaks of gamma values at different relaxation times (tau) correlate with different parallel resistor and capacitor (RC) elements in the electro-optic device comprising a sealing film in contact with electrophoretic medium. Each peak is an average of relaxation time for all RC elements with similar relaxation times in the electro-optic device. The gamma value for each relaxation time is a measure of resistance in the corresponding RC element. Most likely, the relaxation time (tau) at 4 1/s corresponds with RC elements at the sealing film-electrophoretic medium interface. As it can be seen for both electrophoretic media A and B, the resistance at the interface of sealing film and electrophoretic medium are lower in the case of sealing films that comprise water-soluble ether (dipropylene glycol dimethyl ether). Lower interfacial resistance corresponds to improved electro-optic performance, as the data in the Example Tables.

E. Determination of the Surface Energy of the Film.

The surface energy of the prepared sealing films (as described in B1 above) were measured using a Drop Shape Analyzer supplied by Kruss GmbH. Using a syringe with a needle, a 2.6 μL size droplet of deionized water was placed on the top surface of the sealing film and the contact angle between the liquid (water) and the sealing film was measured. The measurement was repeated by replacing the water droplet with a diiodomethane droplet. By performing contact measurements using these two liquids of known surface energy, the surface energy of the film was calculated. The contact angle measurement was repeated three times for each liquid (water and diiodomethane). The contact angle between the liquid and the top surface of the sealing film was measured using the high resolution camera after 5 s, 30 s, and 55 s from the time that the droplet was placed on the sample film. Then, using the Owens, Wendt, Rabel and Kaelble (OWRK) method, the total surface energy and its polar and dispersive components were calculated for each data point. The reported surface energies were averages of 9 data points (3 droplets×3 time scales).

F. Preparation for the Electro-Optic Device.

Figure 10:
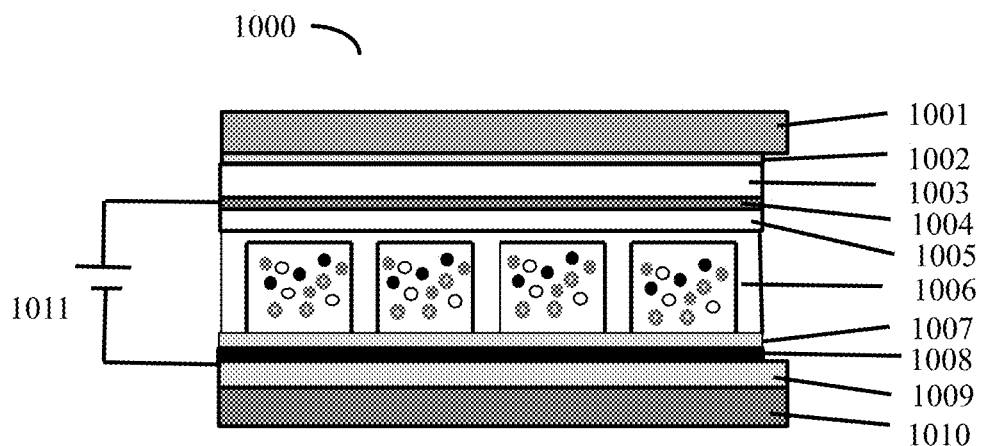
FIG. 10 illustrates the structure of the electro-optic device that was used for the evaluation of the electro-optic performance of aqueous sealing compositions.

An electro-optic device was prepared by filling a plurality of microcells with a mixture of electrically charged pigment particles (white, cyan, magenta, and yellow) in Isopar E. The white and yellow particles were negatively charged, and the cyan and magenta particles were positively charged. Then, the aqueous sealing composition was coated on the opening of the microcells as described in B above. The device illustrated in FIG. 10 was constructed. The electro-optic device 1000 comprised in order: a protective film 1001, a first adhesive layer 1002 that was optically clear, a substrate 1003, a light-transmissive conductive layer 10904, a primer layer 1005, a microcell layer 1006, a sealing film 1007, a second adhesive layer 1008, an ITO electrode layer 1009, and a Glass layer 1010. A source of electric field 1011 electrically connected the light-transmissive conductive layer 1004 with the ITO electrode layer 1009. Waveforms were applied through this source to drive the desired optical state. The first light-transmissive layer 1002 had approximate thickness of 25 μm. The substrate 903 had approximate thickness of 100 μm. The primary layer 1005 had approximate thickness of 0.4 μm. The microcell layer 1006 comprised a plurality of microcells. Each microcell had an approximate bottom thickness of 0.4 μm and approximate height of 10 μm. The sealing film 807 had approximate thickness of 10 μm and the second adhesive layer had approximate thickness of 4.5 μm.

G. Color Gamut Measurement.

Figure 11:
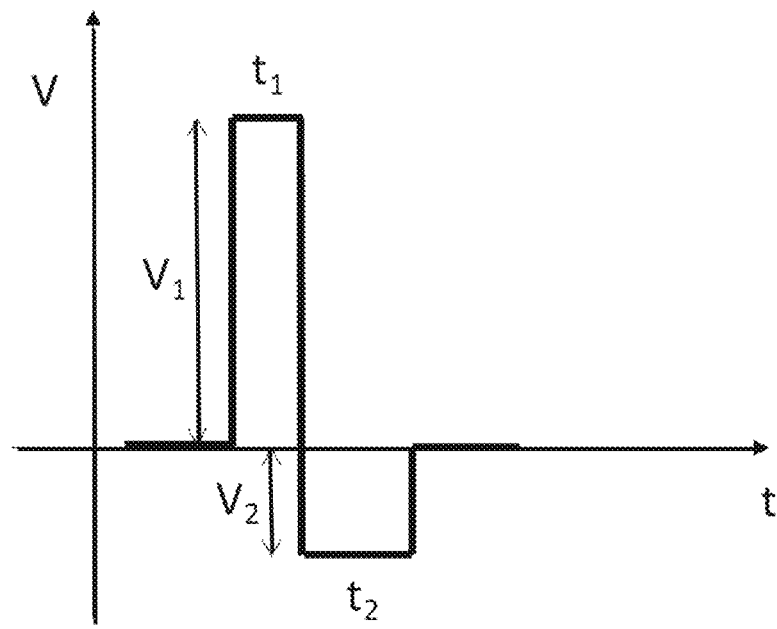
FIG. 11 illustrates a waveform that was used for the determination of the color gamut of inventive and control electro-optic devices.

The electro-optic devices prepared by Method F were electrically driven to generate eight optical states. The electrophoretic devices were addressed using sequences of electrical pulses (such sequences being referred to as a "waveform"). In the following description, the voltages used in the waveform are those supplied to the rear electrodes of the display, assuming that the electrode at the front (viewing) surface of the display is a common electrode to all pixels and is connected to ground. Test waveforms comprise sequence of "dipoles" as shown in FIG. 11. Each dipole is composed of two monopoles, each being a pulse of length t and magnitude V. The two monopoles in each dipole are of opposite polarity.

The voltages used in the test waveforms were +/−24V, +/−18V, +/−15V and +/−10V. Time was discretized into units of 11.74 ms, called "frames". Each frame would correspond to one scan of a thin-film transistor array backplane refreshed at a frequency of 85 Hz, although in the test described the backplane was segmented and directly driven.

Two types of test waveform were used to assess the electro-optical performance of a device. The waveforms used in the first test had a length of 18 frames, while those used in the second test had a length of 42 frames. In each case, the waveform was populated with as many identical dipoles as would fit within the allowed number of frames. This is shown in Tables 1 and 2, which correspond to the 18 and 42-frame waveform types, respectively.

TABLE 1

| Waveform Used in the First Test (18 Frames) | | | | | | |
|---|---|---|---|---|---|---|
| Dipole length Repeats (frames) | | First monopole length (frames) | | | | |
| 3 | 6 | 5 | 4 | 3 | 2 | 1 |
| 1.5 | 12 | 10 | 8 | 6 | 4 | 2 |
| 1 | 18 | 15 | 12 | 9 | 6 | 3 |

TABLE 2

Waveform Used in the Second Test (42 Frames).

| Repeats | Dipole length (frames) | First monopole length (frames) | | | | | | |
|---|---|---|---|---|---|---|---|---|
| 7 | 6 |  |  |  | 3 |  |  |  |
| 6 | 7 | 6 | 5 | 4 |  | 3 | 2 | 1 |
| 3 | 14 | 12 | 10 | 8 | 7 | 6 | 4 | 2 |
| 2 | 21 | 18 | 15 | 12 |  | 9 | 6 | 3 |
| 1 | 42 | 36 | 30 | 24 | 21 | 18 | 12 | 6 |

The length of the second monopole was the dipole length minus the length of the first monopole. Note that "first" and "second" do not necessarily imply a particular temporal ordering of the monopoles to make up a dipole. Not every dipole corresponding to these rules was employed. In order to make the test of a more reasonable length, only waveforms where $(V_2 * t_2)/(V_1 * t_1) < 2$ were employed.

Each waveform was preceded by a DC-balancing pulse (having an impulse equal and opposite to the particular test waveform) and a reset of the display to a white state. Each waveform ended with a 3-second period of grounding.

The color state of the display (measured in CIELab L*, a* and b* units) was recorded after the 3 seconds of grounding. The color gamut of the display was measured by computing the volume of the convex hull containing every colored state produced by the set of testing waveforms. The eight color states generated were red, green, blue, yellow, cyan, magenta, white, and black (R, G, B, Y, C, M, W, and K). The color gamut is reported in $DE^3$ units. Broader color gamut, that is, larger space, means better electro-optic performance of the electro-optic device.

H. Determination of Interfacial Tension of Polymers.

The interfacial tension between Polymer 1 and Polymer 2 for the specific combinations of polymers was calculated from surface tension values (determined via the method described in H above). The calculation of the interfacial tension between the two ingredients was performed by using the values for the surface energy of each ingredient and the following geometric equation:

$$\sigma_{AB} = \sigma_A + \sigma_B - 2(\sqrt{\sigma_A^D \cdot \sigma_B^D} + \sqrt{\sigma_A^P \cdot \sigma_B^P})$$

where $\sigma_{AB}$ is the interfacial tension between polymer A and B; $\sigma_A$ is the total surface energy of polymer A; $\sigma_B$ is the total surface energy of polymer B; $\sigma_A^D$ and; $\sigma_B^D$ is dispersive component of the surface energy of polymer A and B, respectively; $\sigma_A^P$ and $\sigma_B^P$ are polar component of surface.

Analogously, the interfacial tension between a sealing film and an adhesive layer may be measured. An adhesive layer standard comprising polyurethane formed by an aqueous dispersion of water dispersible polyurethane.

I. Evaluation of Barrier Property of Sealing Films Towards Non-Polar Fluids.

Figure 12:
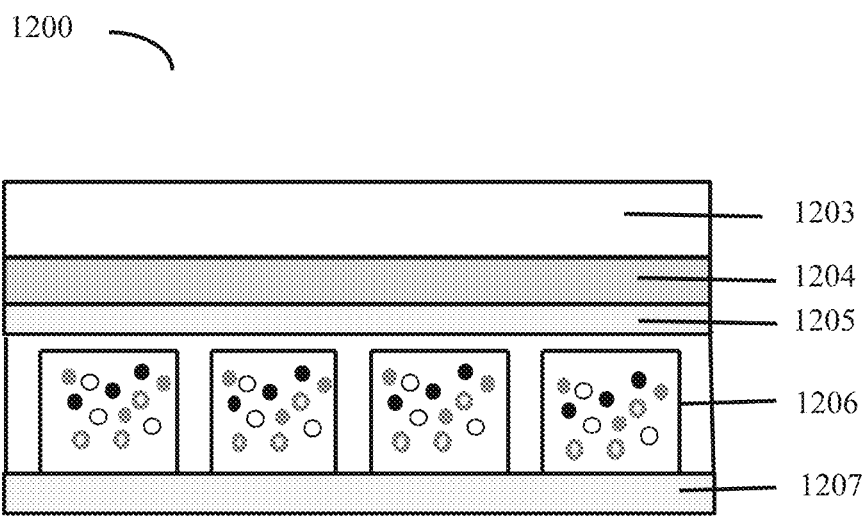
FIG. 12 illustrates a side view of the structure of the electro-optic device that was used for the evaluation of the barrier properties of aqueous sealing compositions.
Figure 13A:
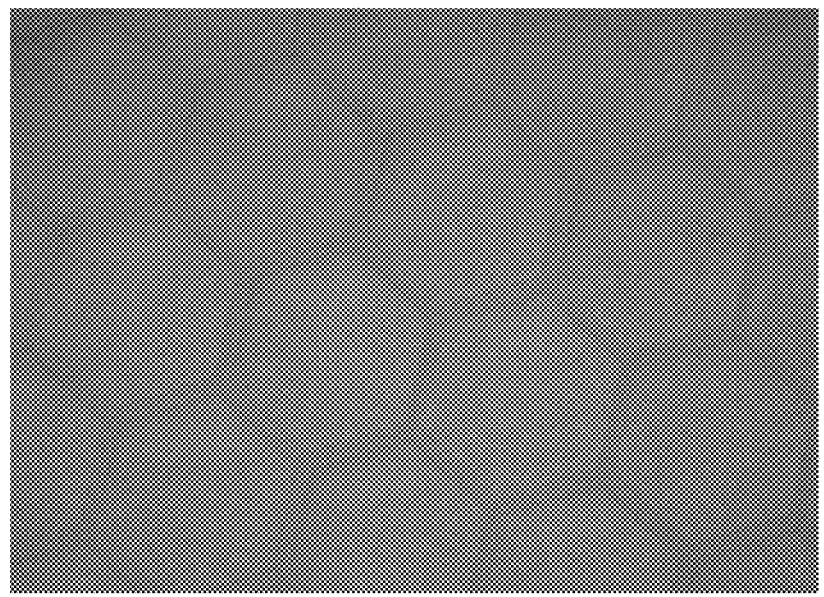
FIGS. 13A-13D show microscope images of microcells evaluated for barrier properties.
Figure 13B:
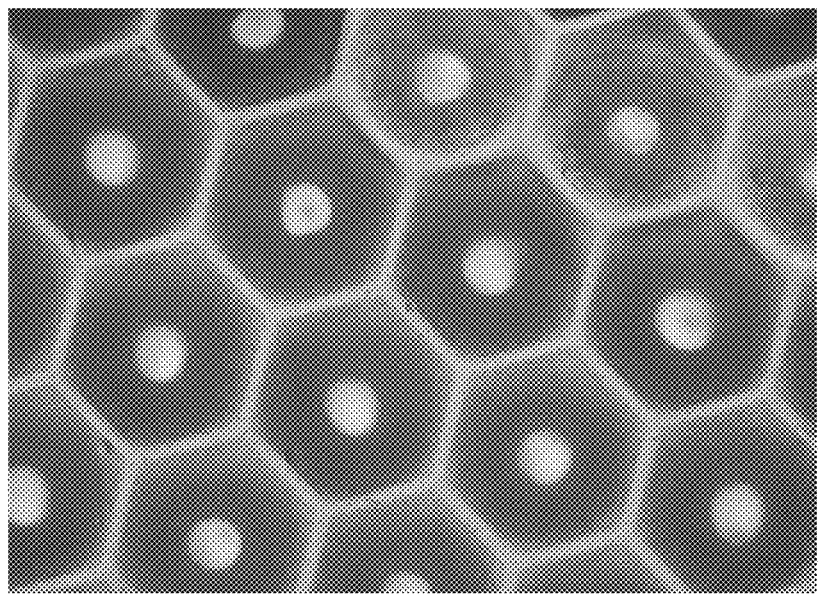
Figure 13C:
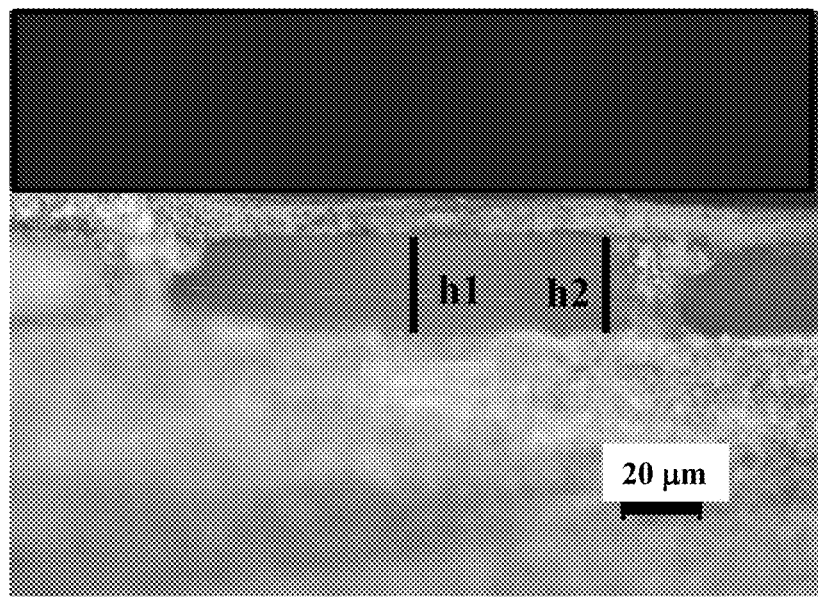
Figure 13D:
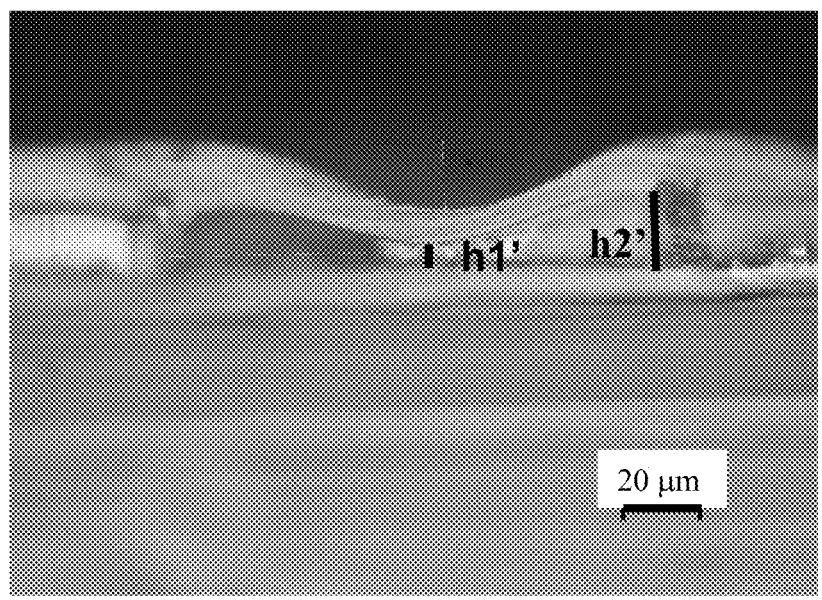

An aqueous dispersion was prepared by mixing 10 grams of poly(vinyl alcohol) homopolymer or 10 grams of poly(vinyl alcohol-co-ethylene) copolymer and 10 grams of polyurethane in 100 mL of water. The dispersion was used as an aqueous polymer composition to form a sealing film of a device 1200 illustrated in FIG. 12. The sealing film was formed by the method described in B1 above. The device 1200 comprised in order: a substrate 1203, a light-transmissive conductive layer 1204, a primer layer 1205, a microcell layer 1206, and a sealing film 1207. The microcell included an electrophoretic medium comprising white, black, and red pigment particles in Isopar E. The device 1200 was stored at 70° C. for at least 24 hours. After this period, the electro-optic device was inspected using an optical microscopy for sagging of the sealing film caused by the loss of the non-polar fluid of the electrophoretic medium. If the distance between the bottom of the inspected microcavity and the lowest point of the bottom surface of the sealing film is less than 85% of the distance between the bottom of the microcavity and the highest point of the lower surface of the sealing film at the same microcell, the aqueous polymer composition is labeled as "Fail" for its barrier property. Otherwise, that is, if the distance between the bottom of the inspected microcell and the lowest point of the sealing film is 85% or more of the distance between the bottom of the microcell and the highest point of the bottom surface of the sealing film at the inspected microcell, the sealing the aqueous polymer composition is labeled as "Pass" for its barrier property. For example, the aqueous polymer composition that was used to prepared the electro-optic device illustrated in FIG. 13C was labeled as "Pass" because the ratio of h2:h1 is 1 (no sagging), whereas the aqueous polymer composition that was used to prepared the electro-optic device illustrated in FIG. 13D was labeled as "Fail" because the ratio of h2:h1 is 35% (sagging level of more than 85%). The barrier property evaluation may also be performed qualitatively by observing the prepared electro-optic device by an optical microscopy looking from the viewing surface of the device. Devices that comprise severely sagged sealing films have significantly different appearance from devices that comprise sealing films with good barrier property towards non-polar fluids (non-uniform versus uniform surface). For example, microcells having aqueous polymer composition that correspond to sealing film of FIG. 13C ("Pass") appears uniform as shown in FIG. 13A, as opposed to microcells having aqueous polymer composition that correspond to sealing film of FIG. 13D ("Fail"), which appears non-uniform as shown in FIG. 13B. The evaluation of various combinations of (1) poly(vinyl alcohol) homopolymer or Poly(vinyl alcohol-co-ethylene) copolymer and (2) polyurethane are shown in Table 10. Polymer 1 is poly(vinyl alcohol) homopolymer or poly(vinyl alcohol-co-ethylene) copolymer, and Polymer 2 is Polyurethane. Details on the commercial material of Polymer 1 and Polymer 2 can be found in Table 11.

J. Determination of the Content of Water-Soluble Ether in a Sealing Film.

The content of the water-soluble ether in the sealing film was determined by the combination of thermogravimetric analysis (TGA) and Karl Fischer (KF) moisture analysis.

The sum of the amounts of the water-soluble ether and moisture in the sealing film is determined by the thermogravimetric analysis method described below. The moisture content in the sealing film is measured using Karl Fischer methodology at 150° C. The content of the water-soluble ether in the sealing film was then calculated by subtracting the moisture content (KF) from the sum of the amounts of the water-soluble ether and moisture (TGA). The thermogravimetric analysis include (a) taring a sample holder, (b) placing the sample into the sample holder and weighed, (c) equilibrating the sample at 30° C., (d) heating the sample to 105° C. at the heating rate of 50° C./minute, (e) holding the sample at 105° C. for 10 minutes to evaporate the moisture and other volatile materials to be removed from the sample, (f) heating the sample to 215° C. at the rate of 50° C./minute, (g) holding the sample at 215° C. for 10 minutes to evaporate the water-soluble ether, (h) heating the sample to 650° C. at the rate of 20° C./minute for complete degradation of the sample. The sample was kept under nitrogen gas during the thermogravimetric analysis. The total amount of moisture and the water-soluble ether was obtained by the weight loss of the sample from 40° C. to 220° C. using Trios software.

Evaluation Results

Unless otherwise stated, the amounts of the components in the disclosed compositions in the following tables are provided in weight percent of the component by weight of the composition excluding water. The term Q.S. (quantum satis) is used in some compositions to represent the content of the water carrier. It means that the content of water in the composition is as much as is needed to achieve the total 100% of the composition, and not more.

If there was any residual or absorbed water or moisture in the sealing film, the disclosed contents of the components of the sealing film are calculated as weight % of the component by weight of excluding the residual or absorbed water, unless otherwise stated.

The example compositions having numbers ending in the letter F correspond to sealing film compositions, whereas the rest of the example compositions correspond to aqueous sealing compositions. The example of sealing film composition correspond to the same Example number (with a suffix F) as the aqueous sealing compositions that is used to prepare the sealing film composition. Thus, Ex. 1F (sealing film composition) is prepared from Ex 1 (aqueous sealing composition).

The content of the water-soluble ether in the sealing film of Example 19F was determined to be 8.6 weight % by weight of the sealing film, using the method described in J above. The content of the water-soluble ether in the other sealing film examples was calculated as 63% of the total water-soluble ether at the aqueous sealing composition.

TABLE 3A

Aqueous sealing compositions comprising a water-soluble ether for determination of volume resistivity (TCBC).

| Ingredients | Ex. 1 | Ex. 2 | Ex. 3 | Ex. 4 | Ex. 5 | Comparative Ex. 6 |
|---|---|---|---|---|---|---|
| Poly(vinyl alcohol-co-ethylene) copolymer; [1] | 5.7 | 5.6 | 5.7 | 5.7 | 5.6 | 5.8 |
| Polyurethane; [2] | 1.8 | 1.8 | 1.8 | 1.8 | 1.8 | 1.8 |
| Carbon black; [3] | 4.0 | 3.9 | 4.0 | 4.0 | 3.9 | 4.0 |
| Polycarbodiimide Multifunctional polycarbodiimide; [4] | 0.11 | 0.11 | 0.11 | 0.11 | 0.11 | 0.12 |
| Hydrophobically modified alkali swellable acrylic emulsions; [5] | 0.10 | 0.10 | 0.10 | 0.10 | 0.10 | 0.10 |
| Siloxane Polyalkyleneoxide Copolymer; [6] | 0.08 | 0.08 | 0.08 | 0.08 | 0.08 | 0.09 |
| Dipropylene glycol dimethyl ether; [7] | 1.8 | 2.7 | | | | |
| Tetraethylene glycol dimethyl ether; [8] | | | 0.9 | 1.8 | 2.7 | 0.0 |
| Ammonium Hydroxide to adjust pH to 6.5-8.5 | | | | | | |
| Deionized water | Q.S. | Q.S. | Q.S. | Q.S. | Q.S. | Q.S. |

| Ingredients | Ex. 7 | Ex. 8 | Comparative Ex. 9 |
|---|---|---|---|
| Poly(vinyl alcohol-co-ethylene) copolymer; [1] | 5.4 | 5.4 | 5.5 |
| Polyurethane; [2] | 2.0 | 2.0 | 2.1 |
| Carbon black; [3] | 3.9 | 3.8 | 4.0 |
| Polycarbodiimide Multifunctional polycarbodiimide; [4] | 0.22 | 0.22 | 0.23 |
| Hydrophobically modified alkali swellable acrylic emulsions; [5] | 0.10 | 0.10 | 0.10 |
| Siloxane Polyalkyleneoxide Copolymer; [6] | 0.09 | 0.08 | 0.09 |
| Dipropylene glycol dimethyl ether; [7] | | | |
| Tetraethylene glycol dimethyl ether; [8] | 2.0 | 3.0 | 0.0 |
| Ammonium Hydroxide to adjust pH to 6.5-8.5 | | | |
| Deionized water | Q.S. | Q.S. | Q.S. |

TABLE 3B

Sealing films comprising a water-soluble ether for determination of volume resistivity (TCBC).

| Ingredients | Ex. 1F | Ex. 2F | Ex. 3F | Ex. 4F | Ex.5F | Comparative Ex. 6F |
|---|---|---|---|---|---|---|
| Poly(vinyl alcohol-co-ethylene) copolymer; [1] | 44.3 | 42.5 | 46.2 | 42.0 | 39.2 | 48.4 |
| Polyurethane; [2] | 14.8 | 14.3 | 15.5 | 14.0 | 13.2 | 16.3 |
| Carbon black; [3] | 31.0 | 29.8 | 32.4 | 29.3 | 27.5 | 33.8 |
| Hydrophobically modified alkali swellable acrylic emulsions; [5] | 0.8 | 0.8 | 0.8 | 0.7 | 0.7 | 0.8 |

TABLE 3B-continued

Sealing films comprising a water-soluble ether for determination of volume resistivity (TCBC).

| | | | | | | |
|---|---|---|---|---|---|---|
| Siloxane Polyalkyleneoxide Copolymer; [6] | 0.6 | 0.6 | 0.6 | 0.6 | 0.6 | 0.8 |
| Dipropylene glycol dimethyl ether; [7] | 8.4 | 11.9 | | | | |
| Tetraethylene glycol dimethyl ether; [8] | | | 4.5 | 13.3 | 18.8 | |
| Volume Resistivity (TCBC) Ohm·cm | $7.1 \times 10^7$ | $7.2 \times 10^8$ | $5.4 \times 10^8$ | $2.5 \times 10^8$ | $2.7 \times 10^8$ | $1.2 \times 10^9$ |

| Ingredients | Ex. 7F | Ex. 8F | Comparative Ex. 9F |
|---|---|---|---|
| Poly(vinyl alcohol-co-ethylene) copolymer; [1] | 42.0 | 40.2 | 46.2 |
| Polyurethane; [2] | 17.3 | 16.6 | 19.1 |
| Carbon black; [3] | 30.0 | 28.8 | 33.1 |
| Hydrophobically modified alkali swellable acrylic emulsions; [5] | 0.8 | 0.7 | 0.8 |
| Siloxane Polyalkyleneoxide Copolymer; [6] | 0.7 | 0.6 | 0.8 |
| Dipropylene glycol dimethyl ether; [7] | 9.2 | 13.1 | |
| Tetraethylene glycol dimethyl ether; [8] | | | |
| Volume Resistivity (TCBC) Ohm·cm | $3.2 \times 10^8$ | $3.4 \times 10^8$ | $3.0 \times 10^9$ |

Table 3A and 3B shows that aqueous sealing compositions that comprise a water-soluble ether, such as dipropylene glycol dimethyl ether or tetraethylene glycol dimethyl ether, form sealing films that have volume resistivity (TCBC) lower than $10^9$ Ohm·cm, as opposed to control aqueous sealing compositions that do not comprise a water-soluble ether, which form sealing films having higher volume resistivity. This is shown by comparing Ex. 1F-5F and Comparative Ex. 6F, and comparing Ex. 7F-8F and Comparative Ex. 9F.

TABLE 4A

Aqueous sealing compositions comprising dipropylene glycol dimethyl ether for determination of color gamut of the corresponding electro-optic device

| Ingredients | Ex. 10 | Comparative Ex. 11 |
|---|---|---|
| Poly(vinyl alcohol-co-ethylene) copolymer; [1] | 8.5 | 8.6 |
| Polyurethane; [2] | 2.7 | 2.7 |
| Carbon black; [3] | 5.9 | 6.0 |
| Polycarbodiimide Multifunctional polycarbodiimide; [4] | 0.17 | 0.17 |
| Hydrophobically modified alkali swellable acrylic emulsions; [5] | 0.15 | 0.13 |
| Siloxane Polyalkyleneoxide Copolymer; [6] | 0.13 | 0.08 |
| Dipropylene glycol dimethyl ether; [7] | 2.07 | |
| Tetraethylene glycol dimethyl ether; [8] | | |
| Ammonium Hydroxide to adjust pH to 6.5-8.5 | | |
| Deionized water | Q.S. | Q.S. |

TABLE 4B

Sealing films comprising dipropylene glycol dimethyl ether for determination of color gamut of the corresponding electro-optic device.

| Ingredients | Ex. 10F | Comparative Ex. 11F |
|---|---|---|
| Poly(vinyl alcohol-co-ethylene) copolymer; [1] | 45.1 | 48.6 |
| Polyurethane; [2] | 15.2 | 16.3 |
| Carbon black; [3] | 31.5 | 34.0 |

TABLE 4B-continued

Sealing films comprising dipropylene glycol dimethyl ether for determination of color gamut of the corresponding electro-optic device.

| Ingredients | Ex. 10F | Comparative Ex. 11F |
|---|---|---|
| Hydrophobically modified alkali swellable acrylic emulsions; [5] | 0.8 | 0.7 |
| Siloxane Polyalkyleneoxide Copolymer; [6] | 0.7 | 0.5 |
| Dipropylene glycol dimethyl ether; [7] | 6.7 | 0.0 |
| Tetraethylene glycol dimethyl ether; [8] | | |
| Color Gamut at 0° C. ($DE^3$) | 16700 | 10900 |
| Color Gamut at 25° C. ($DE^3$) | 35400 | 24500 |

TABLE 5A

Aqueous sealing compositions comprising dipropylene glycol dimethyl ether for determination of color gamut of the corresponding electro-optic device

| Ingredients | Ex. 12 | Comparative Ex. 13 |
|---|---|---|
| Poly(vinyl alcohol-co-ethylene) copolymer; [1] | 7.7 | 7.8 |
| Polyurethane; [2] | 3.3 | 3.4 |
| Carbon black; [3] | 6.2 | 6.2 |
| Polycarbodiimide Multifunctional polycarbodiimide; [4] | 0.22 | 0.37 |
| Hydrophobically modified alkali swellable acrylic emulsions; [5] | 0.19 | 0.22 |
| Siloxane Polyalkyleneoxide Copolymer; [6] | 0.19 | 0.19 |
| Dipropylene glycol dimethyl ether; [7] | 1.7 | 0.0 |
| Tetraethylene glycol dimethyl ether; [8] | | |
| Ammonium Hydroxide to adjust pH to 6.5-8.5 | | |
| Deionized water | Q.S. | Q.S. |

TABLE 5B

Sealing films comprising dipropylene glycol dimethyl ether for determination of color gamut of the corresponding electro-optic device.

| Ingredients | Ex. 12F | Comparative Ex. 13F |
|---|---|---|
| Poly(vinyl alcohol-co-ethylene) copolymer; [1] | 41.0 | 43.1 |
| Polyurethane; [2] | 18.7 | 20.5 |
| Carbon black; [3] | 32.8 | 34.2 |
| Hydrophobically modified alkali swellable acrylic emulsions; [5] | 1.0 | 1.2 |
| Siloxane Polyalkyleneoxide Copolymer; [6] | 1.0 | 1.0 |
| Dipropylene glycol dimethyl ether; [7] | 5.5 | |
| Tetraethylene glycol dimethyl ether; [8] | | |
| Color Gamut at 0° C. (DE$^3$) | 18000 | 14100 |
| Color Gamut at 25° C. (DE$^3$) | 14200 | 11500 |

TABLE 6A

Aqueous sealing compositions comprising dipropylene glycol dimethyl ether for determination of color gamut of the corresponding electro-optic device

| Ingredients | Ex. 14 | Comparative Ex. 15 |
|---|---|---|
| Poly(vinyl alcohol-co-ethylene) copolymer; [1] | 6.1 | 6.2 |
| Polyurethane; [2] | 3.3 | 3.4 |
| Carbon black; [3] | 7.8 | 7.9 |
| Polycarbodiimide Multifunctional polycarbodiimide; [4] | 0.37 | 0.38 |
| Hydrophobically modified alkali swellable acrylic emulsions; [5] | 0.15 | 0.16 |
| Siloxane Polyalkyleneoxide Copolymer; [6] | 0.13 | 0.13 |
| Dipropylene glycol dimethyl ether; [7] | 1.7 | |
| Ammonium Hydroxide to adjust pH to 6.5-8.5 | | |
| Deionized water | Q.S. | Q.S. |

TABLE 6B

Sealing films comprising dipropylene glycol dimethyl ether for determination of color gamut of the corresponding electro-optic device.

| Ingredients | Ex. 14F | Comparative Ex. 15F |
|---|---|---|
| Poly(vinyl alcohol-co-ethylene) copolymer; [1] | 33.4 | 34.1 |
| Polyurethane aqueous dispersion; [2] | 20.3 | 20.8 |
| Carbon black; [3] | 42.6 | 43.5 |
| Hydrophobically modified alkali swellable acrylic emulsions; [5] | 0.8 | 0.9 |
| Siloxane Polyalkyleneoxide Copolymer; [6] | 0.7 | 0.7 |
| Dipropylene glycol dimethyl ether; [7] | 2.2 | 0.0 |
| Color Gamut at 0° C. (DE$^3$) | 19600 | 18400 |
| Color Gamut at 25° C. (DE$^3$) | 33100 | 28000 |

TABLE 7A

Aqueous sealing compositions comprising dipropylene glycol dimethyl ether for determination of color gamut of the corresponding electro-optic device

| Ingredients | Ex. 16 | Comparative Ex. 17 |
|---|---|---|
| Poly(vinyl alcohol-co-ethylene) copolymer; [1] | 8.2 | 8.3 |
| Polyurethane; [2] | 2.7 | 2.8 |
| Carbon black; [3] | 6.1 | 6.2 |
| Polycarbodiimide Multifunctional polycarbodiimide; [4] | 0.48 | 0.48 |
| Hydrophobically modified alkali swellable acrylic emulsions; [5] | 0.22 | 0.22 |
| Siloxane Polyalkyleneoxide Copolymer; [6] | 0.19 | 0.19 |
| Dipropylene glycol dimethyl ether; [7] | 0.7 | 0 |
| Ammonium Hydroxide to adjust pH to 6.5-8.5 | | |
| Deionized water | Q.S. | Q.S. |

TABLE 7A

Sealing films comprising tetraethylene glycol dimethyl ether, for determination of color gamut of the corresponding electro-optic device.

| Ingredients | Ex. 16F | Comparative Ex. 17F |
|---|---|---|
| Poly(vinyl alcohol-co-ethylene) copolymer; [1] | 47.1 | 48.4 |
| Polyurethane; [2] | 15.8 | 16.2 |
| Carbon black; [3] | 32.9 | 33.8 |
| Hydrophobic ally modified alkali swellable acrylic emulsions; [5] | 0.8 | 0.8 |
| Siloxane Polyalkyleneoxide Copolymer; [6] | 0.7 | 0.7 |
| Tetraethylene glycol dimethyl ether; [8] | 2.7 | 0.0 |
| Color Gamut at 0° C. (DE$^3$) | 14900 | 10200 |

Tables 4A, 4B, 5A, 5B, 4A, 6B, 7A, and 7B show that aqueous sealing compositions that comprise a water-soluble ether, such as dipropylene glycol dimethyl ether or tetraethylene glycol dimethyl ether, form sealing films that have larger color gamut than control aqueous sealing compositions that do not comprise a water-soluble ether. This is shown by comparing inventive examples versus the corresponding comparative examples. The improved electro-optic performance is consistently observed in color gamut measured at different temperatures (0° C. and 25° C.).

TABLE 8A

Aqueous sealing compositions comprising dipropylene glycol dimethyl ether for determination of interfacial tension with adhesive film.

| Ingredients | Ex. 18 | Ex. 19 | Comparative Ex. 20 |
|---|---|---|---|
| Poly(vinyl alcohol-co-ethylene) copolymer; [1] | 8.5 | 8.4 | 8.6 |
| Polyurethane; [2] | 2.7 | 2.7 | 2.7 |
| Carbon black; [3] | 5.9 | 5.9 | 6.0 |
| Polycarbodiimide Multifunctional polycarbodiimide; [4] | 0.17 | 0.17 | 0.17 |
| Hydrophobically modified alkali swellable acrylic emulsions; [5] | 0.15 | 0.15 | 0.15 |
| Siloxane Polyalkyleneoxide Copolymer; [6] | 0.13 | 0.13 | 0.13 |
| Dipropylene glycol dimethyl ether; [7] | 2.07 | 2.76 | 0 |
| Tetraethylene glycol dimethyl ether; [8] | | | |
| Ammonium Hydroxide to adjust pH to 6.5-8.5 | | | |
| Deionized water | Q.S. | Q.S. | Q.S. |

TABLE 8B

Sealing films comprising dipropylene glycol dimethyl ether for determination of interfacial tension with adhesive film.

| Ingredients | Ex. 18F | Ex. 19F | Comparative Ex. 20F |
|---|---|---|---|
| Poly(vinyl alcohol-co-ethylene) copolymer; [1] | 45.1 | 44.2 | 48.4 |
| Polyurethane aqueous dispersion; [2] | 15.2 | 14.8 | 16.2 |
| Carbon black; [3] | 31.5 | 30.9 | 33.8 |
| Hydrophobically modified alkali swellable acrylic emulsions; [5] | 0.8 | 0.8 | 0.8 |
| Siloxane Polyalkyleneoxide Copolymer; [6] | 0.7 | 0.7 | 0.7 |
| Dipropylene glycol dimethyl ether; [7] | 6.7 | 8.6 | 0.0 |
| Tetraethylene glycol dimethyl ether; [8] | | | |
| Interfacial Tension with adhesive (mN/m) | 19.2 | 18.2 | 21.6 |

TABLE 9A

Aqueous sealing compositions comprising tetraethylene glycol dimethyl ether for determination of interfacial tension with adhesive film

| Ingredients | Ex. 21 | Comparative Ex. 22 |
|---|---|---|
| Poly(vinyl alcohol-co-ethylene) copolymer; [1] | 7.8 | 7.8 |
| Polyurethane; [2] | 3.3 | 3.4 |
| Carbon black; [3] | 6.1 | 6.2 |
| Polycarbodiimide Multifunctional polycarbodiimide; [4] | 0.37 | 0.37 |
| Hydrophobically modified alkali swellable acrylic emulsions; [5] | 0.15 | 0.22 |
| Siloxane Polyalkyleneoxide Copolymer; [6] | 0.13 | 0.19 |
| Dipropylene glycol dimethyl ether; [7] | 1.7 | 0 |
| Tetraethylene glycol dimethyl ether; [8] | | |
| Ammonium Hydroxide to adjust pH to 6.5-8.5 | | |
| Deionized water | Q.S. | Q.S. |

TABLE 9B

Sealing films comprising tetraethylene glycol dimethyl ether; for determination of interfacial tension with adhesive film

| Ingredients | Ex. 21F | Comparative Ex. 22F |
|---|---|---|
| Poly(vinyl alcohol-co-ethylene) copolymer; [1] | 41.2 | 43.9 |
| Polyurethane; [2] | 19.6 | 20.2 |
| Carbon black; [3] | 32.2 | 33.7 |
| Hydrophobically modified alkali swellable acrylic emulsions; [5] | 0.8 | 1.2 |
| Siloxane Polyalkyleneoxide Copolymer; [6] | 0.7 | 1.0 |
| Dipropylene glycol dimethyl ether; [7] | 5.5 | 0.0 |
| Tetraethylene glycol dimethyl ether; [8] | | |
| Interfacial Tension with adhesive (mN/m) | 15.6 | 23.2 |

Tables 8A, 8B, 9A, and 9B, show that aqueous sealing compositions that comprise a water-soluble ether, such as dipropylene glycol dimethyl ether (Ex. 18-19 and Ex. 21), form sealing films that have interfacial tension with an adhesive layer lower than 20 mN/m, as opposed to aqueous sealing compositions that do not comprise a water-soluble ether (Comparative Ex. 20 and Comparative Ex. 22).

[1] Poly(vinyl alcohol-co-ethylene) copolymer; Exceval™ RS-1717, supplied by Kuraray;
[2] Polyurethane aqueous dispersion; L3838 aqueous dispersion, supplied by Hauthaway as a 35% dispersion in water;
[3] Carbon Black; Nerox® 3500, supplied by Orion Engineered Carbon;
[4] Polycarbodiimide (Multifunctional polycarbodiimide—Water Solution); CARBODILITE® V-02-L2, supplied by Nisshinbo Chemical as a 40% solution in water;
[5] Hydrophobically modified alkali swellable acrylic emulsion; Solthix™ A-100, supplied by Lubrizol;
[6] Siloxane Polyalkyleneoxide Copolymer; Silwet® L-7607 copolymer, supplied by Momentive;
[7] Dipropylene glycol dimethyl ether; Proglyde® DMM, supplied by Dow Chemical;
[8] Tetraethylene glycol dimethyl ether; supplied by Sigma Aldrich (CAS 143-24-8).

Table 10 includes surface energy data for the various Polymer 1 species, which is water-soluble poly(vinyl alcohol) homopolymer or poly(vinyl alcohol-co-ethylene) copolymer, and Polymer 2 species, which is polyurethane. It also includes evaluation of the barrier properties of various layers and calculated interfacial of the various polymer combinations. The method for the preparation of the corresponding polymer layers that were used for barrier property evaluation is described in I above. The determination of surface energy (according to the method described in E above) was performed by first preparing and conditioning a sealing film from the corresponding aqueous compositions comprising only one polymer. The interfacial tension for each polymer combination was calculated from surface energy data and the calculation method described in H above.

TABLE 10

Barrier Property of Sealing Films

| | | | Polymer 1 | | |
|---|---|---|---|---|---|
| | Polymer 1 | Polymer 2 | Polarity (mN/m) | Degree of Hydrolysis % | % Ethylene Content |
| Comparative Ex. 23 | RS1717 | AM8100 | 13.3 | 93 | 8 |
| Comparative Ex. 24 | RS1717 | Dispercoll U 58 | 13.3 | 93 | 8 |
| Comparative Ex. 25 | RS1717 | Dispercoll 2643 U XP | 13.3 | 93 | 8 |
| Comparative Ex. 26 | RS1717 | WS-5000 | 13.3 | 93 | 8 |
| Comparative Ex. 27 | RS1717 | Dispercoll U 56 | 13.3 | 93 | 8 |
| Comparative Ex. 28 | RS1717 | Witcobond 386-03 | 13.3 | 93 | 8 |

TABLE 10-continued

Barrier Property of Sealing Films

|  | Polymer 1 | Polymer 2 | | | |
|---|---|---|---|---|---|
| Comparative Ex. 29 | RS1717 | BPI-UD-104 | 13.3 | 93 | 8 |
| Comparative Ex. 30 | RS1717 | Witcobond 737 | 13.3 | 93 | 8 |
| Comparative Ex. 31 | RS2817SB | Witcobond 386-03 | 27.8 | 96.5 | 10 |
| Comparative Ex. 32 | RS1713 | Witcobond 737 | 16.9 | 93 | 8 |
| Comparative Ex. 33 | RS1713 | Witcobond 386-03 | 16.9 | 93 | 8 |
| Comparative Ex. 34 | OKS1009 | Witcobond 737 | 11.5 | >99 | 0 |
| Comparative Ex. 35 | RS1717 | Witcobond A-100 | 13.3 | 93 | 8 |
| Ex. 36 | RS1717 | HD-2503 | 13.3 | 93 | 8 |
| Ex. 37 | RS1717 | HD-2125 | 13.3 | 93 | 8 |
| Ex. 38 | RS1717 | L3838 | 13.3 | 93 | 8 |
| Ex. 39 | RS1717 | PU677 | 13.3 | 93 | 8 |
| Ex. 40 | RS1717 | Takelac WPB341 | 13.3 | 93 | 8 |
| Ex. 41 | RS1717 | L-2897 | 13.3 | 93 | 8 |
| Ex. 42 | RS1717 | Dispercoll 2815U XP | 13.3 | 93 | 8 |
| Ex. 43 | RS2817SB | Dispercoll U 58 | 27.8 | 96.5 | 10 |
| Ex. 44 | RS2817SB | Dispercoll U 56 | 27.8 | 96.5 | 10 |
| Ex. 45 | Z410 | HD-2125 | 17.5 | 98 | 0 |
| Ex. 46 | OKS1109 | HD-2125 | 18.3 | >99 | 0 |
| Ex. 47 | OKS1009 | HD-2125 | 11.5 | >99 | 0 |
| Ex. 48 | RS1113 | HD-2125 | 22.9 | 98.5 | 8 |

|  |  |  | Polymer 2 | | |
|---|---|---|---|---|---|
|  | Polymer 1 | Polymer 2 | Disperse Component of Surface Energy (mN/m) | Polar Component of Surface Energy (mN/m) | Surface Energy (mN/m) |
| Comparative Ex. 23 | RS1717 | AM8100 | 33 | 1.0 | 34 |
| Comparative Ex. 24 | RS1717 | Dispercoll U 58 | 47 | 32.2 | 79 |
| Comparative Ex. 25 | RS1717 | Dispercoll 2643 U XP | 33 | 3.4 | 37 |
| Comparative Ex. 26 | RS1717 | WS-5000 | 45 | 3.5 | 48 |
| Comparative Ex. 27 | RS1717 | Dispercoll U 56 | 45 | 28.6 | 74 |
| Comparative Ex. 28 | RS1717 | Witcobond 386-03 | 39 | 4.3 | 43 |
| Comparative Ex. 29 | RS1717 | BPI-UD-104 | 38 | 5.0 | 43 |
| Comparative Ex. 30 | RS1717 | Witcobond 737 | 42 | 5.2 | 47 |
| Comparative Ex. 31 | RS2817SB | Witcobond 386-03 | 39 | 4.3 | 43 |
| Comparative Ex. 32 | RS1713 | Witcobond 737 | 42 | 5.2 | 47 |
| Comparative Ex. 33 | RS1713 | Witcobond 386-03 | 39 | 4.3 | 43 |
| Comparative Ex. 34 | OKS1009 | Witcobond 737 | 42 | 5.2 | 47 |
| Comparative Ex. 35 | RS1717 | Witcobond A-100 | 47 | 4.3 | 52 |
| Ex. 36 | RS1717 | HD-2503 | 48 | 11.5 | 59 |
| Ex. 37 | RS1717 | HD-2125 | 48 | 14.2 | 62 |
| Ex. 38 | RS1717 | L3838 | 47 | 11.4 | 58 |
| Ex. 39 | RS1717 | PU677 | 44 | 16.8 | 61 |
| Ex. 40 | RS1717 | Takelac WPB341 | 45 | 14.2 | 59 |
| Ex. 41 | RS1717 | L-2897 | 48 | 13.3 | 61 |
| Ex. 42 | RS1717 | Dispercoll 2815U XP | 37 | 14.8 | 52 |
| Ex. 43 | RS2817SB | Dispercoll U 58 | 47 | 32.2 | 79 |
| Ex. 44 | RS2817SB | Dispercoll U 56 | 45 | 28.6 | 74 |
| Ex. 45 | Z410 | HD-2125 | 48 | 14.2 | 62 |
| Ex. 46 | OKS1109 | HD-2125 | 48 | 14.2 | 62 |
| Ex. 47 | OKS1009 | HD-2125 | 48 | 14.2 | 62 |
| Ex. 48 | RS1113 | HD-2125 | 48 | 14.2 | 62 |

|  | Polymer 1 | Polymer 2 | PVA-PUD Interfacial Tension (mN/m) | Pass/Fail |
|---|---|---|---|---|
| Comparative Ex. 23 | RS1717 | AM8100 | 7.2 | FAIL |
| Comparative Ex. 24 | RS1717 | Dispercoll U 58 | 4.3 | FAIL |
| Comparative Ex. 25 | RS1717 | Dispercoll 2643 U XP | 3.4 | FAIL |
| Comparative Ex. 26 | RS1717 | WS-5000 | 3.4 | FAIL |
| Comparative Ex. 27 | RS1717 | Dispercoll U 56 | 3.2 | FAIL |
| Comparative Ex. 28 | RS1717 | Witcobond 386-03 | 2.5 | FAIL |
| Comparative Ex. 29 | RS1717 | BPI-UD-104 | 2.0 | FAIL |
| Comparative Ex. 30 | RS1717 | Witcobond 737 | 2.0 | FAIL |
| Comparative Ex. 31 | RS2817SB | Witcobond 386-03 | 10.5 | FAIL |
| Comparative Ex. 32 | RS1713 | Witcobond 737 | 4.2 | FAIL |
| Comparative Ex. 33 | RS1713 | Witcobond 386-03 | 3.4 | FAIL |
| Comparative Ex. 34 | OKS1009 | Witcobond 737 | 2.9 | FAIL |
| Comparative Ex. 35 | RS1717 | Witcobond A-100 | 3.0 | FAIL |
| Ex. 36 | RS1717 | HD-2503 | 0.6 | PASS |
| Ex. 37 | RS1717 | HD-2125 | 0.6 | PASS |
| Ex. 38 | RS1717 | L3838 | 0.5 | PASS |
| Ex. 39 | RS1717 | PU677 | 0.4 | PASS |
| Ex. 40 | RS1717 | Takelac WPB341 | 0.3 | PASS |

TABLE 10-continued

Barrier Property of Sealing Films

| | | | | |
|---|---|---|---|---|
| Ex. 41 | RS1717 | L-2897 | 0.2 | PASS |
| Ex. 42 | RS1717 | Dispercoll 2815U XP | 0.03 | PASS |
| Ex. 43 | RS2817SB | Dispercoll U 58 | 0.1 | PASS |
| Ex. 44 | RS2817SB | Dispercoll U 56 | 0 | PASS |
| Ex. 45 | Z410 | HD-2125 | 0.4 | PASS |
| Ex. 46 | OKS1109 | HD-2125 | 0.8 | PASS |
| Ex. 47 | OKS1009 | HD-2125 | 0.4 | PASS |
| Ex. 48 | RS1113 | HD-2125 | 1.8 | PASS |

TABLE 11

Commercial materials used in the Examples of Table 10.

| | Polymer | Chemical Name | Commercial Name | Supplier |
|---|---|---|---|---|
| RS1717 | Polymer 1 | Poly(vinyl alcohol-co-ethylene) copolymer | Exceval ™ RS-1717 | Kuraray |
| RS2817SB | Polymer 1 | Poly(vinyl alcohol-co-ethylene) copolymer | Exceval ™ RS-2817SB | Kuraray |
| RS1713 | Polymer 1 | Poly(vinyl alcohol-co-ethylene) copolymer | Exceval ™ RS-1713 | Kuraray |
| OKS1009 | Polymer 1 | Poly(vinyl alcohol) homopolymer | OKS-1009 | Soarus |
| OKS1110 | Polymer 1 | Poly(vinyl alcohol) homopolymer | OKS-1109 | Soarus |
| Z410 | Polymer 1 | Poly(vinyl alcohol) homopolymer | GOHSENX ™ Z-410 | Soarus |
| RS1113 | Polymer 1 | Poly(vinyl alcohol-co-ethylene) copolymer | Exceval ™ RS-1113 | Kuraray |
| AM8100 | Polymer 2 | Polyurethane aqueous dispersion (polyamide) | Aptalon ™ M8100 | Lubrizol |
| Dispercoll ® U58 | Polymer 2 | Polyurethane aqueous dispersion | Dispercoll ® U58 | Covestro |
| Dispercoll ® 2643 U XP | Polymer 2 | Polyurethane aqueous dispersion | Dispercoll ® U XP 2643 | Covestro |
| WS-5000 | Polymer 2 | Polyurethane aqueous dispersion | Takelac ™ WS-5000 | Mitsui Chemicals |
| Witcobond ® 386-03 | Polymer 2 | Polyurethane aqueous dispersion (polyester) | Witcobond ® 386-03 | Chemtura Corp. |
| BPI-UD-104 | Polymer 2 | Polyurethane aqueous dispersion (polyester) | Bondathane ™ UD 104 (BPI-ID 104) | Bond Polymers International |
| Witcobond ® 737 | Polymer 2 | Polyurethane aqueous dispersion (polyester) | Witcobond ® 737 | Chemtura Corp. |
| Witcobond ® A-100 | Polymer 2 | Polyurethane aqueous dispersion | Witcobond ® A-100 | Chemtura Corp. |
| HD-2503 | Polymer 2 | Polyurethane aqueous dispersion | Hauthane HD-2503 | Hauthane & Sons Corp. |
| HD-2125 | Polymer 2 | Polyurethane aqueous dispersion (polyester, polycarbonate) | Hauthane HD-2125 | Hauthane & Sons Corp. |
| L3838 | Polymer 2 | Polyurethane aqueous dispersion (polyester) | Hauthane L3838 | Hauthane & Sons Corp. |
| PU677 | Polymer 2 | Polyurethane aqueous dispersion | Relca ® PU-677 | Stahl |
| Takelac ™ WPB341 | Polymer 2 | Polyurethane aqueous dispersion (polyester) | Takelac ™ WBP-341 | Mitsui Chemicals |
| L-2897 | Polymer 2 | Polyurethane aqueous dispersion (polyester) | Hauthane L2897 | Hauthane & Sons Corp. |
| Dispercoll ® 2815U XP | Polymer 2 | Polyurethane aqueous dispersion (polyester) | Dispercoll ® U 2815 XP | Covestro |
| Dispercoll ® U56 | Polymer 2 | Polyurethane aqueous dispersion (polyester) | Dispercoll ® U56 | Covestro |

The data of interfacial tension of Polymer 1 and Polymer 2 of Table 10 show that the sealing films that comprise (a) poly(vinyl alcohol) polymer or poly(vinyl alcohol-co-ethylene) copolymer having a degree of hydrolysis of from 90% to 99.5% and ethylene content of less than 10%, and (b) a polyurethane in an aqueous carrier, wherein the interfacial tension between the two polymers (a) and (b) is less than 2 mN/m, form sealing films that have good barrier properties for a non-polar fluid.

The data of Table 10 also show that the sealing films made from aqueous sealing compositions that comprise (a) poly(vinyl alcohol) polymer or poly(vinyl alcohol-co-ethylene) copolymer having a degree of hydrolysis of from 90% to 99.5% and ethylene content of less than 10%, and (b) a polyurethane in an aqueous carrier, wherein the polar component of the surface energy of the polyurethane is between 10 and 25 mN/m, form sealing films that have good barrier properties for a non-polar fluid.

Figure 14:
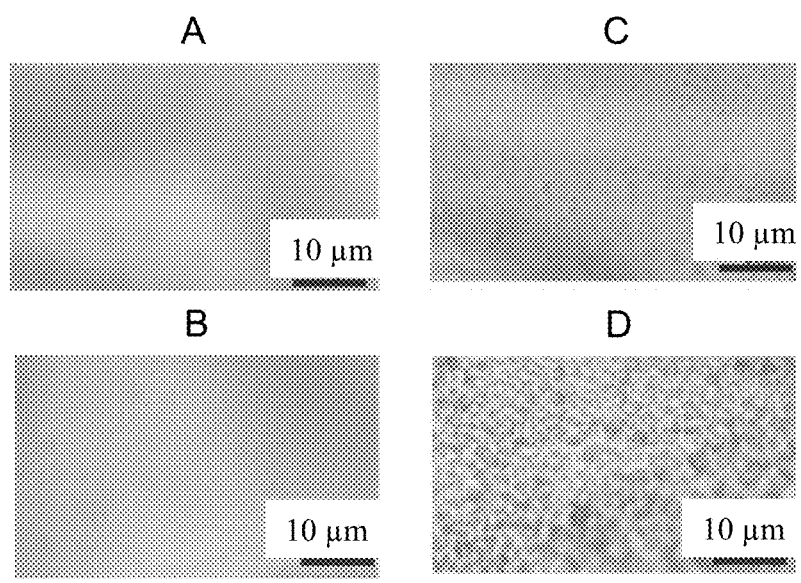
FIG. 14 shows microscopic images of sealing films comprising a combination of poly(vinyl alcohol-co-ethylene) copolymer and polyurethane having different interfacial tensions.

Microscopic evaluation of sealing films prepared by four aqueous sealing compositions prepared by the method described in B1 above showed that there is a correlation between uniformity of the film and the interfacial tension between the two polymers. Table 12 and the microscopic images of FIG. 14 show that lower interfacial tension provides more uniform sealing films. The improved compatibility achieved by the combination of the polymers having smaller interfacial tension, may explain the improved barrier properties of the corresponding layer.

TABLE 12

Sealing films comprising a combination of poly(vinyl alcohol-co-ethylene) copolymer and polyurethane having different interfacial tensions.

| Polymer 1 | Polymer 2 | PVA-PUD interfacial tension (mN/m) | Microscopic Image FIG. 14 |
|---|---|---|---|
| Poly(vinyl alcohol-co-ethylene) copolymer; Exceval ™ RS-1717, supplied by Kuraray | Polyurethane aqueous dispersion Witcobond ® 373-05, supplied by Chemtura | 0.03 | A |

TABLE 12-continued

Sealing films comprising a combination of poly(vinyl alcohol-co-ethylene) copolymer and polyurethane having different interfacial tensions.

| Polymer 1 | Polymer 2 | PVA-PUD interfacial tension (mN/m) | Microscopic Image FIG. 14 |
|---|---|---|---|
| Poly(vinyl alcohol-co-ethylene) copolymer; Exceval™ RS-1717, supplied by Kuraray | Polyurethane aqueous dispersion (polyester) Dispercoll® 2815 XP, supplied by Covestro | 1.95 | B |
| Poly(vinyl alcohol-co-ethylene) copolymer; Exceval™ RS-1717, supplied by Kuraray | Polyurethane aqueous dispersion (polyester) Dispercoll® 2643 U XP, supplied by Covestro | 3.42 | C |
| Poly(vinyl alcohol-co-ethylene) copolymer; Exceval™ RS-1717, supplied by Kuraray | Polyurethane aqueous dispersion Witcobond® 361-72, supplied by Chemtura | 4.42 | D |

Furthermore, it was observed during the study, that aqueous sealing compositions comprising more than 70 weight % of poly(vinyl alcohol) homopolymer or poly(vinyl alcohol-co-ethylene) copolymer by weight of the aqueous sealing composition excluding water form sealing films that absorb significant amount of moisture from the environment. This high moisture absorption negatively affects the electro-optic performance of the display.

What is claimed is:

1. A sealing film comprising:
   a water-soluble poly (vinyl alcohol) homopolymer or poly (vinyl alcohol-co-ethylene) copolymer at a content of from 15 weight % to 60 weight % by weight of the sealing film, the poly (vinyl alcohol) homopolymer having a degree of hydrolysis of from 90% to 99.5%, and the poly (vinyl alcohol-co-ethylene) copolymer having a degree of hydrolysis of from 90% to 99.5% and ethylene content of less than 10%, the ethylene content being the proportion of ethylene units in the poly (vinyl alcohol-co-ethylene) copolymer;
   a polyurethane at a content of from 7 weight % to 29 weight % by weight of the sealing film;
   carbon black at a content of from 5 weight % to 70 weight % by weight of the sealing film;
   a water-soluble ether at a content of from 0.5 weight % to 25 weight % by weight of the sealing film, the water-soluble ether having molecular weight of from 75 to 5,000 Dalton, and optionally comprising a hydroxyl group.

2. The sealing film of claim 1, wherein the total surface energy of the sealing film is lower than 60 mN/m.

3. The sealing film of claim 1, wherein the interfacial tension between the water-soluble poly (vinyl alcohol) polymer or poly (vinyl alcohol-co-ethylene) copolymer and the polyurethane being less than 2 mN/m.

4. The sealing film of claim 1, wherein the carbon black has oil adsorption number less than 100 mL per 100 mg of carbon black measured using OAN method according to ASTM 2414.

5. The sealing film of claim 1, wherein the carbon black has total surface area less than 70 m²/g measured using the nitrogen adsorption method according to ASTM D 6556.

6. The sealing film of claim 1, wherein the water-soluble ether is a represented by Formula I, Formula II, or Formula III, $$\left[ R2-O-\underset{R1}{\underset{|}{C}}H-CH_2-O \right]_n R3, \quad \text{Formula I}$$

$$R4-O-\underset{}{\underset{|}{C}}H-\underset{}{\underset{|}{C}}H-O-R5, \quad \text{Formula II}$$

$$R6-O-\underset{}{\underset{|}{C}}H-CH_2-CH_2-O-R7, \quad \text{Formula III}$$

wherein
n is 1 to 145;
R1 is hydrogen, methyl or ethyl group;
R2, R3, R4, R5, R6, and R7 are selected independently from the group consisting of hydrogen, linear or branched alkyl group comprising from 1 carbon atom to 6 carbon atoms, phenyl, and benzyl group;
Formula I comprises at least one ether functional group;
Formula II comprises at least one ether functional group; and
Formula III comprises at least one ether functional group.

7. The sealing film of claim 6, wherein n is 1 to 10.

8. The sealing film of claim 1, wherein the water-soluble ether is selected from the group consisting of ethylene glycol monomethyl ether, ethylene glycol monoethyl ether, ethylene glycol mono-n-propyl ether, ethylene glycol monoisopropyl ether, ethylene glycol n-monobutyl ether, ethylene glycol monoisobutyl ether, ethylene glycol mono-t-butyl ether, ethylene glycol monobenzyl ether, ethylene glycol monophenyl ether, ethylene glycol dimethyl ether, ethylene glycol diethyl ether, ethylene glycol di-n-propyl ether, ethylene glycol diisopropyl ether, diethylene glycol monomethyl ether, diethylene glycol monoethyl ether, diethylene glycol mono-n-propyl ether, diethylene glycol monoisopropyl ether, diethylene glycol n-monobutyl ether, diethylene glycol monoisobutyl ether, diethylene glycol mono-t-butyl ether, diethylene glycol monobenzyl ether, diethylene glycol monophenyl ether, diethylene glycol dimethyl ether, diethylene glycol diethyl ether, diethylene glycol ethyl methyl ether, diethylene glycol di-n-propyl ether, diethylene glycol diisopropyl ether, diethylene glycol di-n-butyl, triethylene glycol monomethyl ether, triethylene glycol monoethyl ether, triethylene glycol mono-n-propyl ether, triethylene glycol monoisopropyl ether, triethylene glycol n-monobutyl ether, triethylene glycol monoisobutyl ether, triethylene glycol mono-t-butyl ether, triethylene glycol monobenzyl ether, triethylene glycol monophenyl ether, triethylene glycol dimethyl ether, triethylene glycol diethyl ether, triethylene glycol di-n-propyl ether, triethylene glycol diisopropyl ether, tetraethylene glycol monomethyl ether, tetraethylene glycol monoethyl ether, triethylene glycol monophenyl ether, tetraethylene glycol dimethyl ether, polyethylene glycol monomethyl ether, polyethylene glycol monoethyl ether, polyethylene glycol monophenyl ether, propylene glycol monomethyl ether, propylene glycol monoethyl ether, propylene glycol mono-n-propyl ether, propylene glycol monoisopropyl ether, propylene glycol mono-n-butyl ether, propylene glycol monoisobutyl ether, propylene glycol monophenyl ether, propylene glycol dimethyl ether, propylene glycol diethyl ether, dipropylene glycol monomethyl ether, dipropylene glycol monoethyl ether, dipropylene glycol mono-n-propyl ether, dipropylene glycol monoisopropyl ether, dipropylene glycol mono-n-butyl ether, dipropylene glycol monoisobutyl ether, dipropylene glycol dimethyl ether, dipropylene glycol diethyl ether, dipropylene glycol di-n-propyl ether, dipropylene glycol diisopropyl ether, tripropylene glycol monomethyl ether, tripropylene glycol monoethyl ether, tripropylene glycol mono-n-propyl ether, tripropylene glycol monoisopropyl ether, tripropylene glycol mono-n-butyl ether, and tripropylene glycol monoisobutyl ether.

9. The sealing film of claims 1, further comprising an organosilicone wetting agent.

10. The sealing film of claim 1 having volume resistivity of from $10^8$ to $10^{10}$ Ohm·cm.

11. The sealing film of claim 1, wherein the polyurethane is an ester polyurethane, a polycarbonate polyurethane, or a combination thereof.

12. The sealing film of claim 1, wherein the polyurethane polymer has number average molecular weight from 1,000 to 2,000,000 Daltons.

13. The sealing film of claim 1, wherein the poly (vinyl alcohol) homopolymer or poly (vinyl alcohol-co-ethylene) copolymer has number average molecular weight from 1,000 to 1,000,000 Daltons.

14. The sealing film of claim 1, wherein the poly (vinyl alcohol) polymer or poly (vinyl alcohol-co-ethylene) copolymer has a degree of hydrolysis of from 92% to 99%.

15. The sealing film of claim 1, wherein the poly (vinyl alcohol-co-ethylene) copolymer has ethylene content of less than 9%, the ethylene content being the proportion of ethylene units in the poly (vinyl alcohol-co-ethylene) copolymer.

16. An aqueous sealing composition comprising:
a water-soluble poly (vinyl alcohol) homopolymer or poly (vinyl alcohol-co-ethylene) copolymer at a content of from 14 weight % to 55 weight % by weight of the aqueous sealing composition excluding water, the poly (vinyl alcohol) homopolymer having a degree of hydrolysis of from 90% to 99.5%, and the poly (vinyl alcohol-co-ethylene) copolymer having a degree of hydrolysis of from 90% to 99.5% and ethylene content of less than 10%, the ethylene content being the proportion of ethylene units in the poly (vinyl alcohol-co-ethylene) copolymer to the total number of units in the copolymer;
a polyurethane at a content of from 6 weight % to 27 weight % by weight of the aqueous sealing composition excluding water;
carbon black at a content of from 5 weight % to 64 weight % by weight of the aqueous sealing composition excluding water;
a water-soluble ether at a content of from 1.0 weight % to 40 weight % by weight of the aqueous sealing composition excluding water, the water-soluble ether having molecular weight of from 75 to 5,000 Dalton, and optionally comprising a hydroxyl group; and
water at a content of from 20 weight % to 95 weight % by weight of the aqueous sealing composition.

17. The aqueous sealing composition of claim 16, further comprising a crosslinker at a content of from 0.1 weight % to 8 weight % by weight of the aqueous sealing composition excluding water, the crosslinker being a polyisocyanate, a multifunctional polycarbodiimide, a multifunctional aziridine, a silane coupling agent, a boron/titanium/zirconium-based crosslinker, or a melamine formaldehyde.

18. The aqueous sealing composition of claim 16, further comprising a rheology modifier at a content of from 0.05 weight % to 5 weight % by weight of the sealing film the rheology wherein the aqueous sealing composition has a rheology profile, the rheology profile showing a reduction of the viscosity between viscosity at shear rate of $10^{-4}$ 1/s and the viscosity at shear rate of $10^2$ 1/s by 5 times to 10,000 times.

* * * * *